United States Patent
Sharma et al.

(10) Patent No.: US 12,501,323 B2
(45) Date of Patent: Dec. 16, 2025

(54) MEASUREMENT CONSOLIDATION THRESHOLDS FOR REDUCED CAPABILITY USER EQUIPMENT

(71) Applicant: QUALCOMM Incorporated, San Diego, CA (US)

(72) Inventors: Prashant Sharma, San Jose, CA (US); Muhammad Nazmul Islam, Littleton, MA (US); Linhai He, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 370 days.

(21) Appl. No.: 18/297,456

(22) Filed: Apr. 7, 2023

(65) Prior Publication Data

US 2023/0345313 A1  Oct. 26, 2023

Related U.S. Application Data

(60) Provisional application No. 63/363,280, filed on Apr. 20, 2022.

(51) Int. Cl.
*H04W 36/00* (2009.01)
*H04W 36/08* (2009.01)

(52) U.S. Cl.
CPC . *H04W 36/0058* (2018.08); *H04W 36/00837* (2018.08); *H04W 36/08* (2013.01)

(58) Field of Classification Search
CPC ....... H04W 36/0058; H04W 36/00837; H04W 36/08; H04W 36/0094
See application file for complete search history.

(56) References Cited

U.S. PATENT DOCUMENTS

| | | | |
|---|---|---|---|
| 10,470,200 B2 * | 11/2019 | Gheorghiu | H04L 5/0053 |
| 2017/0223737 A1 * | 8/2017 | Patel | H04L 5/0048 |
| 2020/0022040 A1 | 1/2020 | Chen et al. | |
| 2020/0052803 A1 * | 2/2020 | Deenoo | H04W 48/12 |
| 2020/0077314 A1 * | 3/2020 | Hwang | H04W 76/27 |
| 2020/0100150 A1 | 3/2020 | Da Silva | |
| 2020/0163073 A1 | 5/2020 | Li et al. | |

(Continued)

FOREIGN PATENT DOCUMENTS

| | | | | |
|---|---|---|---|---|
| EP | 3846528 A1 | 7/2021 | | |
| EP | 4185004 A1 * | 5/2023 | | H04W 48/18 |

(Continued)

OTHER PUBLICATIONS

International Search Report and Written Opinion—PCT/US2023/018065—ISA/EPO—Jul. 20, 2023.

(Continued)

*Primary Examiner* — Sujoy K Kundu
*Assistant Examiner* — Vladislav Y Agureyev
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, a measurement configuration that indicates a measurement consolidation threshold. The UE may obtain a neighbor cell measurement based at least in part on a value of the measurement consolidation threshold for a UE having a single receive (Rx) chain. Numerous other aspects are described.

30 Claims, 10 Drawing Sheets

(56) References Cited

U.S. PATENT DOCUMENTS

| | | | |
|---|---|---|---|
| 2020/0205062 A1* | 6/2020 | Azizi | H04W 4/46 |
| 2020/0260311 A1* | 8/2020 | Jung | H04W 76/30 |
| 2020/0322023 A1* | 10/2020 | Kung | H04B 7/088 |
| 2020/0359245 A1 | 11/2020 | Da Silva | |
| 2021/0289583 A1* | 9/2021 | Zhang | H04B 7/0602 |
| 2021/0345191 A1* | 11/2021 | Da Silva | H04B 7/0695 |
| 2021/0345454 A1* | 11/2021 | Dhanapal | H04W 76/27 |
| 2022/0046458 A1* | 2/2022 | Zhu | H04W 72/046 |
| 2022/0149922 A1* | 5/2022 | Wang | H04B 7/0626 |
| 2022/0240110 A1* | 7/2022 | Li | H04W 24/08 |
| 2022/0386197 A1* | 12/2022 | Hwang | H04W 36/362 |
| 2022/0408328 A1* | 12/2022 | Adjakple | H04W 36/0061 |
| 2023/0007601 A1* | 1/2023 | Venkatachari | H04W 52/241 |
| 2023/0129437 A1* | 4/2023 | Jeong | H04W 48/20 370/331 |
| 2023/0275797 A1* | 8/2023 | Chen | H04L 5/0082 375/262 |
| 2023/0276321 A1* | 8/2023 | Da Silva | H04W 36/0088 370/252 |
| 2023/0284065 A1* | 9/2023 | Zhou | H04W 24/10 370/252 |
| 2023/0309171 A1* | 9/2023 | Zhou | H04W 72/23 |
| 2023/0319877 A1* | 10/2023 | Chitrakar | H04W 24/10 370/329 |
| 2024/0022942 A1* | 1/2024 | He | H04B 7/0695 |
| 2024/0063894 A1* | 2/2024 | Vogedes | H04B 7/18541 |
| 2024/0064581 A1* | 2/2024 | Liang | H04B 7/18513 |
| 2024/0073982 A1* | 2/2024 | Wallentin | H04W 76/15 |
| 2024/0080758 A1* | 3/2024 | Yavuz | H04W 48/12 |
| 2024/0414607 A1* | 12/2024 | Gürsu | H04W 36/362 |
| 2024/0422826 A1* | 12/2024 | Turtinen | H04W 74/002 |

FOREIGN PATENT DOCUMENTS

| | | | | |
|---|---|---|---|---|
| EP | 4344303 A1 * | 3/2024 | | H04W 36/302 |
| WO | WO-2018187223 A1 | 10/2018 | | |
| WO | WO-2020156364 A1 * | 8/2020 | | H04W 24/08 |
| WO | WO-2021026908 A1 | 2/2021 | | |
| WO | WO-2021160689 A1 * | 8/2021 | | H04B 7/06966 |
| WO | 2021203380 A1 | 10/2021 | | |
| WO | WO-2023204739 A1 * | 10/2023 | | H04W 36/008357 |

OTHER PUBLICATIONS

Nokia., et al., "Simulation Results for RSS Based RSRP Measurements", 3GPP TSG-RAN WG4 Meeting#90bis, R4-1904112, 3rd Generation Partnership Project (3GPP), Mobile Competence Centre, 650, Route Des Lucioles, F-06921, Sophia-Antipolis Cedex, France, vol. RAN WG4, No. Xi'an, China, Apr. 8, 2019-Apr. 1, 2019, Apr. 1, 2019, pp. 1-6, XP051714470, The Whole Document.

Xiaomi: "Summary of [Post116-e][604][Relay] Remaining issues on Service Continuity (Xiaomi)", R2-21xxxxxx, 3GPP TSG-RAN WG2 #117-e, Electronic meeting, Feb. 21-Mar. 3, 2022, pp. 1-7.

* cited by examiner

MEASUREMENT CONSOLIDATION THRESHOLDS FOR REDUCED CAPABILITY USER EQUIPMENT

CROSS-REFERENCE TO RELATED APPLICATION

This patent application claims priority to U.S. Provisional Patent Application No. 63/363,280, filed on Apr. 20, 2022, entitled "MEASUREMENT CONSOLIDATION THRESHOLDS FOR REDUCED CAPABILITY USER EQUIPMENT," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses associated with measurement consolidation thresholds for a reduced capability (RedCap) user equipment (UE).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE) for wireless communication. The UE may include a memory and one or more processors coupled to the memory. The one or more processors may be configured to cause the UE to receive, from a network node, a measurement configuration that indicates a measurement consolidation threshold. The one or more processors may be configured to cause the UE to obtain a neighbor cell measurement based at least in part on a value of the measurement consolidation threshold for a UE having a single receive (Rx) chain.

Some aspects described herein relate to a network node for wireless communication. The network node may include a memory and one or more processors coupled to the memory. The one or more processors may be configured to determine a value of a measurement consolidation threshold to configure for a UE having a single Rx chain. The one or more processors may be configured to transmit a measurement configuration that includes one or more parameters related to the value of the measurement consolidation threshold for a UE having a single Rx chain.

Some aspects described herein relate to a method of wireless communication performed by a UE. The method may include receiving, from a network node, a measurement configuration that indicates a measurement consolidation threshold. The method may include obtaining a neighbor cell measurement based at least in part on a value of the measurement consolidation threshold for a UE having a single Rx chain.

Some aspects described herein relate to a method of wireless communication performed by a network node. The method may include determining a value of a measurement consolidation threshold to configure for a UE having a single Rx chain. The method may include transmitting a measurement configuration that includes one or more parameters related to the value of the measurement consolidation threshold for a UE having a single Rx chain.

Some aspects described herein relate to a non-transitory computer-readable medium that stores a set of instructions for wireless communication by a UE. The set of instructions, when executed by one or more processors of the UE, may cause the UE to receive, from a network node, a measurement configuration that indicates a measurement consolidation threshold. The set of instructions, when executed by one or more processors of the UE, may cause the UE to obtain a neighbor cell measurement based at least in part on a value of the measurement consolidation threshold for a UE having a single Rx chain.

Some aspects described herein relate to a non-transitory computer-readable medium that stores a set of instructions for wireless communication by a network node. The set of instructions, when executed by one or more processors of the network node, may cause the network node to determine a value of a measurement consolidation threshold to configure for a UE having a single Rx chain. The set of instructions, when executed by one or more processors of the network node, may cause the network node to transmit a measurement configuration that includes one or more parameters related to the value of the measurement consolidation threshold for a UE having a single Rx chain.

Some aspects described herein relate to an apparatus for wireless communication. The apparatus may include means for receiving, from a network node, a measurement configuration that indicates a measurement consolidation threshold. The apparatus may include means for obtaining a neighbor cell measurement based at least in part on a value of the measurement consolidation threshold for an apparatus having a single Rx chain.

Some aspects described herein relate to an apparatus for wireless communication. The apparatus may include means for determining a value of a measurement consolidation threshold to configure for a UE having a single Rx chain. The apparatus may include means for transmitting a measurement configuration that includes one or more parameters related to the value of the measurement consolidation threshold for a UE having a single Rx chain.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
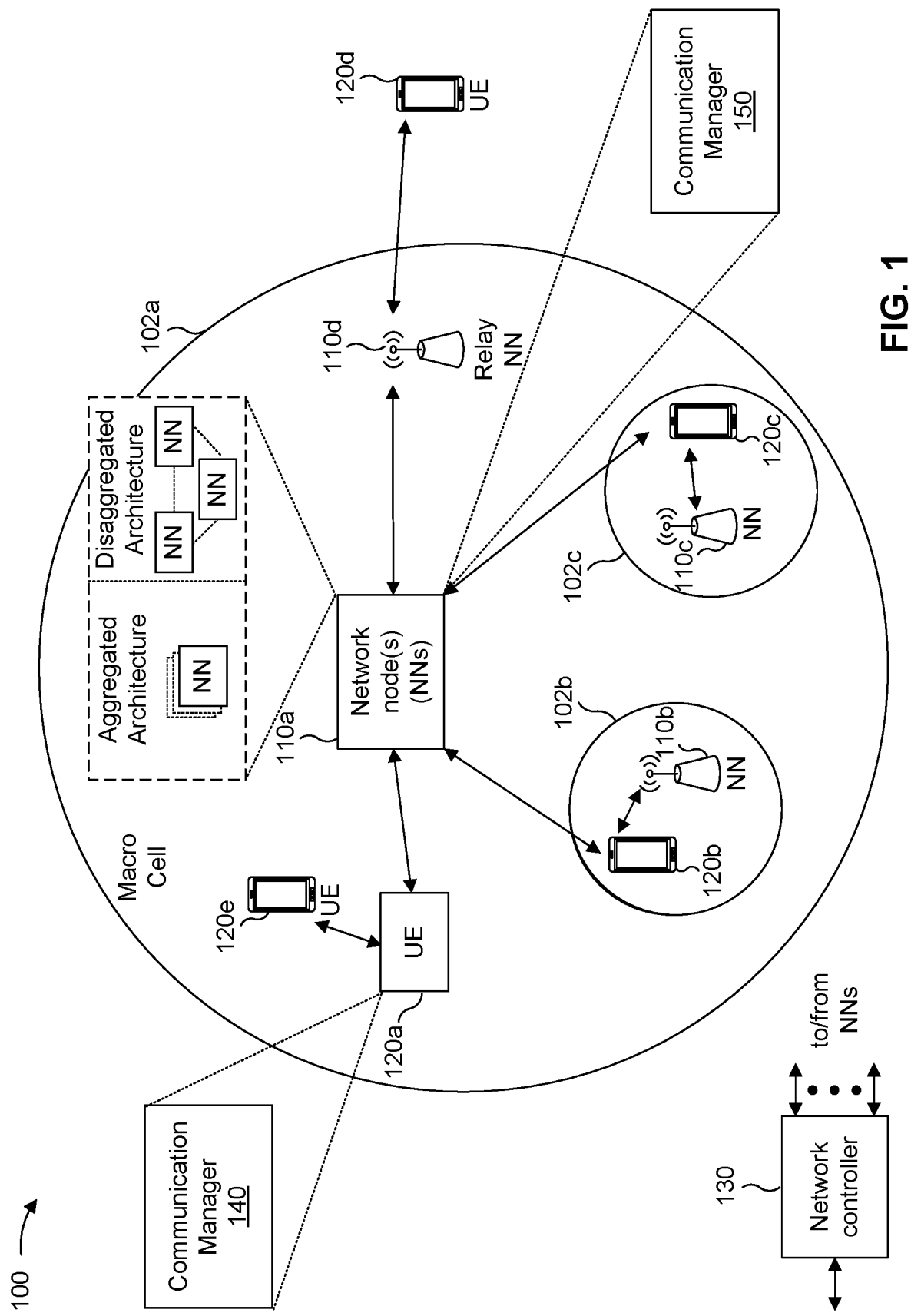
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110d (e.g., a relay network node) may communicate with the network node 110a (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node 110, a measurement configuration that indicates a measurement consolidation threshold; and obtain a neighbor cell measurement based at least in part on a value of the measurement consolidation threshold for a UE 120 having a single receive (Rx) chain. Additionally, or alternatively, the communication manager 140 may perform one or more other operations described herein.

In some aspects, a network node 110 may include a communication manager 150. As described in more detail elsewhere herein, the communication manager 150 may determine a value of a measurement consolidation threshold to configure for a UE 120 having a single Rx chain; and transmit a measurement configuration that includes one or more parameters related to the value of the measurement consolidation threshold for a UE 120 having a single Rx chain. Additionally, or alternatively, the communication manager 150 may perform one or more other operations described herein.

As indicated above, FIG. 1 is provided as an example. Other examples may differ from what is described with regard to FIG. 1.

Figure 2:
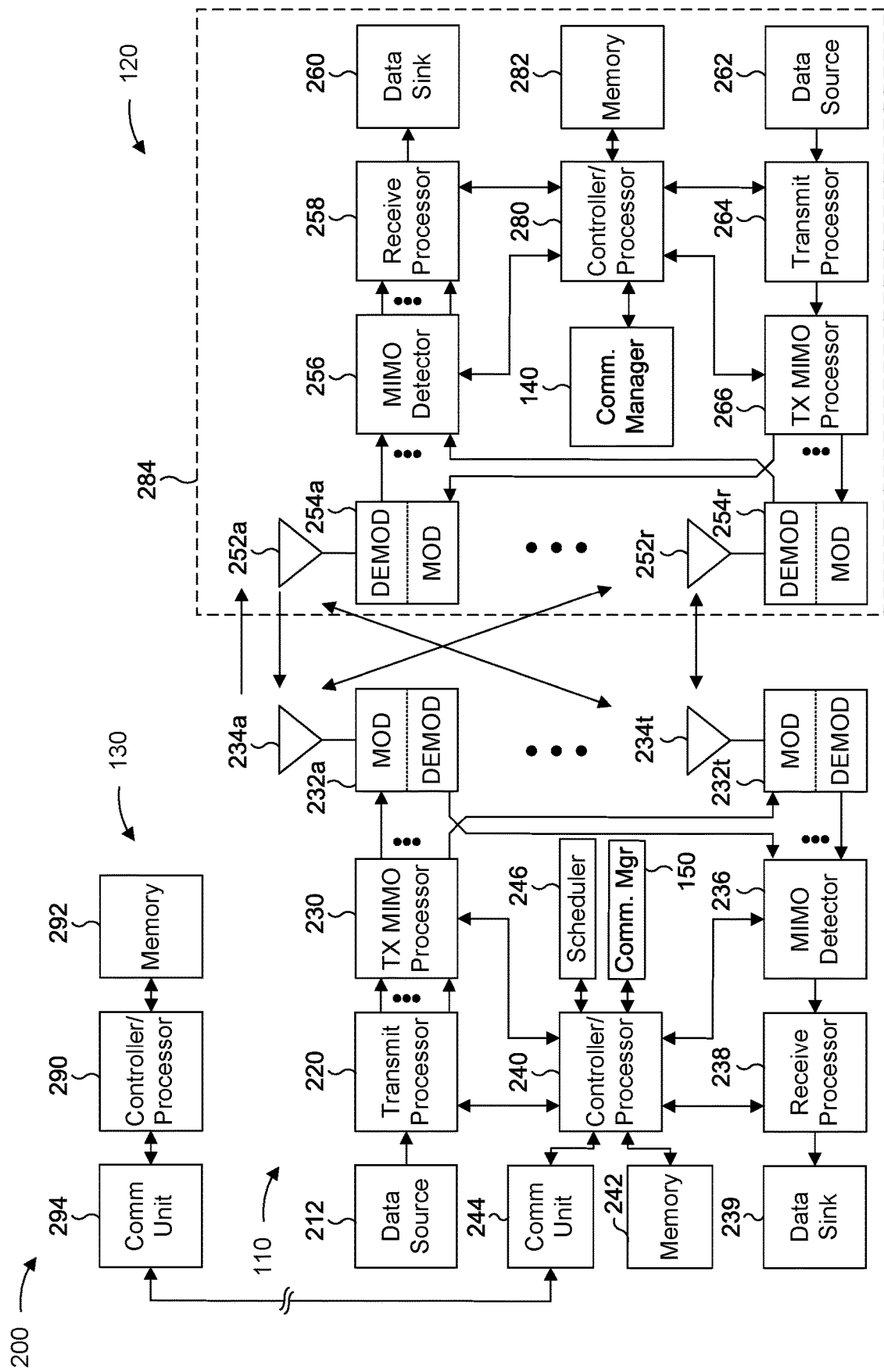
FIG. 2 is a diagram illustrating an example of a base station in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, a signal-to-interference-plus-noise ratio (SINR) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, SINR, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6-10).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6-10).

The controller/processor 240 of the network node 110, the controller/processor 280 of the UE 120, and/or any other component(s) of FIG. 2 may perform one or more techniques associated with measurement consolidation thresholds for a reduced capability (RedCap) UE, as described in more detail elsewhere herein. For example, the controller/processor 240 of the network node 110, the controller/processor 280 of the UE 120, and/or any other component(s) of FIG. 2 may perform or direct operations of, for example, process 700 of FIG. 7, process 800 of FIG. 8, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 700 of FIG. 7, process 800 of FIG. 8, and/or other processes as described herein. In some examples, executing instructions may include running the instructions, converting the instructions, compiling the instructions, and/or interpreting the instructions, among other examples.

In some aspects, the UE 120 includes means for receiving, from a network node 110, a measurement configuration that indicates a measurement consolidation threshold; and/or means for obtaining a neighbor cell measurement based at least in part on a value of the measurement consolidation threshold for a UE 120 having a single Rx chain. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node 110 includes means for determining a value of a measurement consolidation threshold to configure for a UE 120 having a single Rx chain; and/or means for transmitting a measurement configuration that includes one or more parameters related to the value of the measurement consolidation threshold for a UE 120 having a single Rx chain. In some aspects, the means for the network node 110 to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
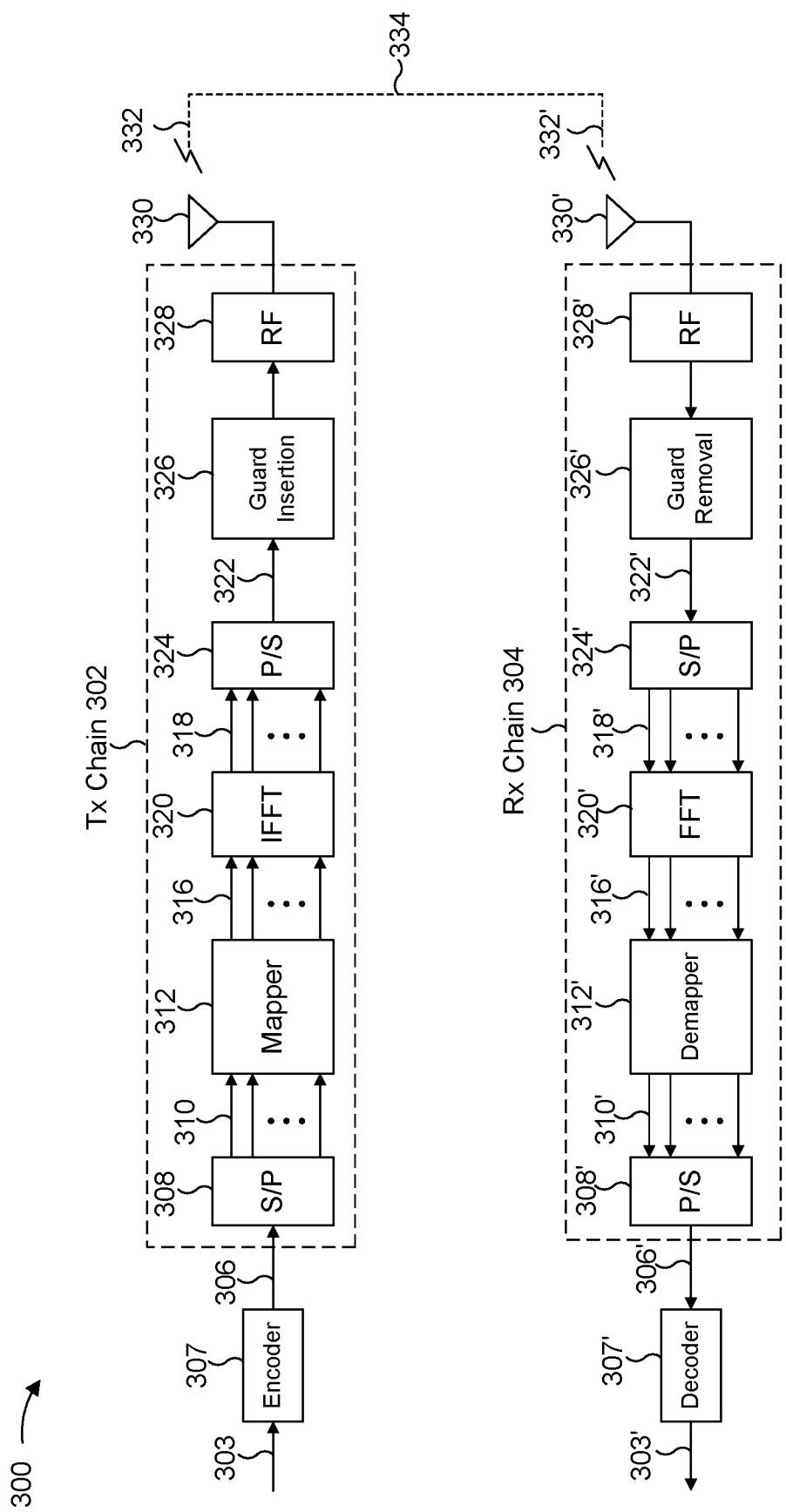
FIG. 3 is a diagram illustrating an example of a transmit chain and a receive chain of a UE, in accordance with the present disclosure.

FIG. 3 is a diagram illustrating an example 300 of a transmit (Tx) chain 302 and a receive (Rx) chain 304 of a UE 120, in accordance with the present disclosure. In some aspects, one or more components of the Tx chain 302 may be implemented in transmit processor 264, TX MIMO processor 266, modem 254, and/or controller/processor 280, as described above in connection with FIG. 2. In some aspects, the Tx chain 302 may be implemented in the UE 120 for transmitting data 306 (e.g., uplink data, an uplink reference signal, and/or uplink control information) to a network node 110 on an uplink channel.

As shown in FIG. 3, an encoder 307 may alter a signal (e.g., a bitstream) 303 into data 306 to be transmitted. The data 306 to be transmitted is provided as input from the encoder 307 to a serial-to-parallel (S/P) converter 308. In some aspects, the S/P converter 308 may split the transmission data into N parallel data streams 310.

The N parallel data streams 310 may then be provided as input to a mapper 312. The mapper 312 may map the N parallel data streams 310 onto N constellation points. The mapping may be performed using a modulation constellation, such as binary phase-shift keying (BPSK), quadrature phase-shift keying (QPSK), 8 phase-shift keying (8PSK), and/or quadrature amplitude modulation (QAM), among other examples. Thus, the mapper 312 may output N parallel symbol streams 316, where each symbol stream 316 corresponds to one of N orthogonal subcarriers of an inverse fast Fourier transform (IFFT) component 320. The N parallel symbol streams 316 are represented in the frequency domain and may be converted into N parallel time domain sample streams 318 by the IFFT component 320.

In some aspects, N parallel modulations in the frequency domain correspond to N modulation symbols in the frequency domain, which are equal to N mapping and N-point IFFT in the frequency domain, which are equal to one (useful) OFDM symbol in the time domain, which are equal to N samples in the time domain. One OFDM symbol in the time domain, Ns, is equal to Ncp (the number of guard samples per OFDM symbol)+N (the number of useful samples per OFDM symbol).

The N parallel time domain sample streams 318 may be converted into an OFDM/OFDMA symbol stream 322 by a parallel-to-serial (P/S) converter 324. A guard insertion component 326 may insert a guard interval between successive OFDM/OFDMA symbols in the OFDM/OFDMA symbol stream 322. The output of the guard insertion component 326 may then be upconverted to a desired transmit frequency band by a radio frequency (RF) front end 328. An antenna 330 may then transmit the resulting signal 332.

In some aspects, the Rx chain 304 may utilize OFDM/OFDMA. In some aspects, one or more components of the Rx chain 304 may be implemented in receive processor 258, MIMO detector 256, modem 254, and/or controller/processor 280, as described above in connection with FIG. 2. In some aspects, the Rx chain 304 may be implemented in the UE 120 for receiving data 306 (e.g., downlink data, a downlink reference signal, and/or downlink control information) from the network node 110 on a downlink channel.

In FIG. 3, a transmitted signal 332 is shown traveling over a wireless channel 334 from the Tx chain 302 to the Rx chain 304. When a signal 332' is received by an antenna 330', the received signal 332' may be downconverted to a baseband signal by an RF front end 328'. A guard removal component 326' may then remove the guard interval that was inserted between OFDM/OFDMA symbols by the guard insertion component 326.

The output of the guard removal component 326' may be provided to an S/P converter 324'. The output may include an OFDM/OFDMA symbol stream 322', and the S/P converter 324' may divide the OFDM/OFDMA symbol stream 322' into N parallel time-domain symbol streams 318', each of which corresponds to one of the N orthogonal subcarriers. A fast Fourier transform (FFT) component 320' may convert the N parallel time-domain symbol streams 318' into the frequency domain and output N parallel frequency-domain symbol streams 316'.

A demapper 312' may perform the inverse of the symbol mapping operation that was performed by the mapper 312, thereby outputting N parallel data streams 310'. A P/S converter 308' may combine the N parallel data streams 310' into a single data stream 306'. Ideally, the data stream 306' corresponds to the data 306 that was provided as input to the Tx chain 302. The data stream 306' may be decoded into a decoded data stream 303' by a decoder 307'.

The number and arrangement of components shown in FIG. 3 are provided as an example. In practice, there may be additional components, fewer components, different components, or differently arranged components than those shown in FIG. 3. Furthermore, two or more components shown in FIG. 3 may be implemented within a single component, or a single component shown in FIG. 3 may be implemented as multiple, distributed components. Additionally, or alternatively, a set of components (e.g., one or more components) shown in FIG. 3 may perform one or more functions described as being performed by another set of components shown in FIG. 3.

Figure 4:
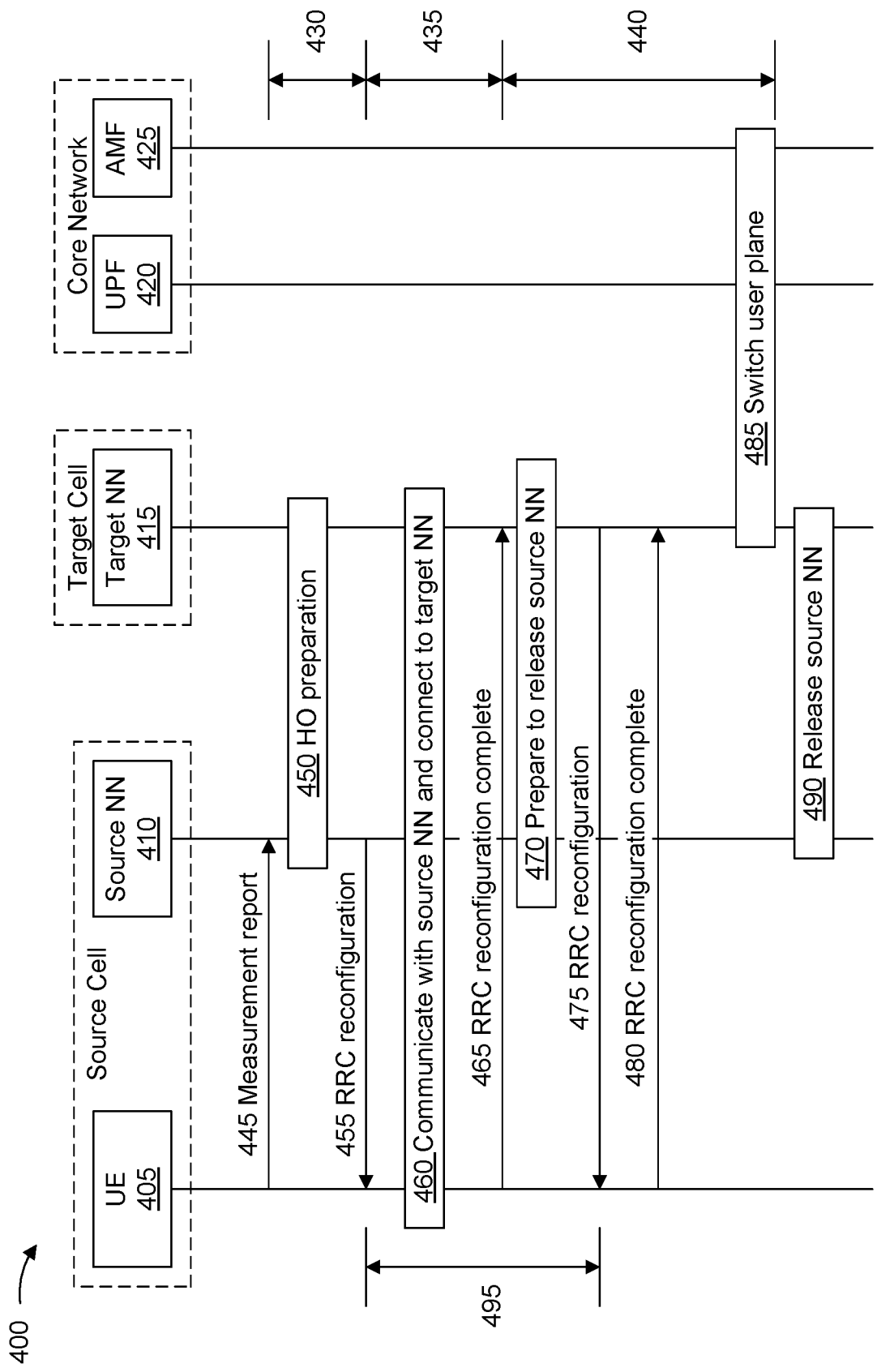
FIG. 4 is a diagram illustrating an example of a make-before-break handover procedure, in accordance with the present disclosure.

FIG. 4 is a diagram illustrating an example 400 of a make-before-break (MBB) handover procedure, in accordance with the present disclosure.

As shown in FIG. 4, the MBB handover procedure may involve a UE 405, a source network node 410, a target network node 415, a user plane function (UPF) device 420, and an access and mobility management function (AMF) device 425. The UE 405 may correspond to the UE 120 described elsewhere herein. The source network node 410 and/or the target network node 415 may correspond to the network node 110 described elsewhere herein. The UPF device 420 and/or the AMF device 425 may correspond to the network controller 130 described elsewhere herein. The UE 405 and the source network node 410 may be connected (e.g., may have a radio resource control (RRC) connection) via a serving cell or a source cell, and the UE 405 may undergo a handover to the target network node 415 via a target cell or a neighbor cell. The UPF device 420 and/or the AMF device 425 may be located within a core network. The source network node 410 and the target network node 415 may be in communication with the core network for mobility support and user plane functions. The MBB handover procedure may include an enhanced MBB handover procedure.

As shown, the MBB handover procedure may include a handover preparation phase 430, a handover execution phase 435, and a handover completion phase 440. During the handover preparation phase 430, the UE 405 may perform one or more radio resource management (RRM) measurements on the source network node 410 and/or one or more neighbor network nodes (e.g., including the target network node 415), and may report RRM measurements that cause the source network node 410 and/or the target network node 415 to prepare for handover and trigger execution of the handover. During the handover execution phase 435, the UE 405 may execute the handover by performing a random access channel (RACH) procedure with the target network node 415 and establishing an RRC connection with the target network node 415. During the handover completion phase 440, the source network node 410 may forward one or more stored communications associated with the UE 405 to the target network node 415, and the UE 405 may be released from a connection with the source network node 410.

As shown by reference number 445, the UE 405 may perform one or more RRM measurements, and may transmit a measurement report to the source network node 410 based at least in part on performing the one or more measurements (e.g., serving cell measurements and/or neighbor cell measurements). The measurement report may indicate, for example, an RSRP parameter, an RSRQ parameter, an RSSI parameter, and/or a SINR parameter (e.g., RSRP, RSRQ, RSSI, and/or SINR measurement quantities for the serving cell and/or one or more neighbor cells). The source network node 410 may use the measurement report to determine whether to trigger a handover to the target network node 415. For example, if one or more measurements satisfy a condition (e.g., an RSRP, RSRQ, RSSI, and/or SINR measurement quantity associated with the target network node 415 satisfies a threshold and/or exceeds an RSRP, RSRQ, RSSI, and/or SINR measurement quantity associated with the source network node 410), then the source network node 410 may trigger a handover of the UE 405 to the target network node 415.

As shown by reference number 450, the source network node 410 and the target network node 415 may communicate with one another to prepare for a handover of the UE 405. As part of the handover preparation, the source network node 410 may transmit a handover request to the target network node 415 to instruct the target network node 415 to prepare for the handover. The source network node 410 may communicate RRC context information associated with the UE 405 and/or configuration information associated with the UE 405 to the target network node 415. The target network node 415 may prepare for the handover by reserving resources for the UE 405. After reserving the resources, the target network node 415 may transmit an acknowledgement (ACK) to the source network node 410 in response to the handover request.

As shown by reference number 455, the source network node 410 may transmit an RRC reconfiguration message to the UE 405. The RRC reconfiguration message may include a handover command instructing the UE 405 to execute a handover procedure from the source network node 410 to the target network node 415. The handover command may include information associated with the target network node 415, such as a RACH preamble assignment for accessing the target network node 415. Reception of the RRC reconfiguration message, including the handover command, by the UE 405 may trigger the start of the handover execution phase 435.

As shown by reference number 460, during the handover execution phase 435 of the MBB handover, the UE 405 may execute the handover by performing a RACH procedure with the target network node 415 (e.g., including synchronization with the target network node 415) while continuing to communicate with the source network node 410. For example, while the UE 405 is performing the RACH procedure with the target network node 415, the UE 405 may transmit uplink data, uplink control information, and/or an uplink reference signal (e.g., a sounding reference signal) to the source network node 410, and/or may receive downlink data, downlink control information, and/or a downlink reference signal from the source network node 410.

As shown by reference number 465, upon successfully establishing a connection with the target network node 415 (e.g., via the RACH procedure), the UE may transmit an RRC reconfiguration completion message to the target network node 415. Reception of the RRC reconfiguration message by the target network node 415 may trigger the start of the handover completion phase 440.

As shown by reference number 470, the source network node 410 and the target network node 415 may communicate with one another to prepare for release of the connection between the source network node 410 and the UE 405. In some aspects, the target network node 415 may determine that a connection between the source network node 410 and the UE 405 is to be released, such as after receiving the RRC reconfiguration message from the UE 405. In this case, the target network node 415 may transmit a handover connection setup completion message to the source network node 410. The handover connection setup completion message may cause the source network node 410 to stop transmitting data to the UE 405 and/or to stop receiving data from the UE 405. Additionally, or alternatively, the handover connection setup completion message may cause the source network node 410 to forward communications associated with the UE 405 to the target network node 415 and/or to notify the target network node 415 of a status of one or more communications with the UE 405. For example, the source network node 410 may forward, to the target network node 415, buffered downlink communications (e.g., downlink data) for the UE 405 and/or uplink communications (e.g., uplink data) received from the UE 405. Additionally, or alternatively, the source network node 410 may notify the target network node 415 regarding a packet data convergence protocol (PDCP) status associated with the UE 405 and/or a sequence number to be used for a downlink communication with the UE 405.

As shown by reference number 475, the target network node 415 may transmit an RRC reconfiguration message to the UE 405 to instruct the UE 405 to release the connection with the source network node 410. Upon receiving the instruction to release the connection with the source network node 410, the UE 405 may stop communicating with the source network node 410. For example, the UE 405 may refrain from transmitting uplink communications to the source network node 410 and/or may refrain from monitoring for downlink communications from the source network node 410.

As shown by reference number 480, the UE may transmit an RRC reconfiguration completion message to the target network node 415 to indicate that the connection between the source network node 410 and the UE 405 is being released or has been released.

As shown by reference number 485, the target network node 415, the UPF device 420, and/or the AMF device 425 may communicate to switch a user plane path of the UE 405 from the source network node 410 to the target network node 415. Prior to switching the user plane path, downlink communications for the UE 405 may be routed through the core network to the source network node 410. After the user plane path is switched, downlink communications for the UE 405 may be routed through the core network to the target network node 415. Upon completing the switch of the user plane path, the AMF device 425 may transmit an end marker message to the source network node 410 to signal completion of the user plane path switch. As shown by reference number 490, the target network node 415 and the source network node 410 may communicate to release the source network node 410.

As part of the MBB handover procedure, the UE 405 may maintain simultaneous connections with the source network node 410 and the target network node 415 during a time period 495. The time period 495 may start at the beginning of the handover execution phase 435 (e.g., upon reception by the UE 405 of a handover command from the source network node 410) when the UE 405 performs the RACH procedure with the target network node 415. The time period 495 may end upon release of the connection between the UE 405 and the source network node 410 (e.g., upon reception by the UE 405 of an instruction, from the target network node 415, to release the source network node 410). By maintaining simultaneous connections with the source network node 410 and the target network node 415, the handover procedure can be performed with zero or a minimal interruption to communications, thereby reducing latency.

As indicated above, FIG. 4 is provided as an example. Other examples may differ from what is described with regard to FIG. 4.

Figure 5:
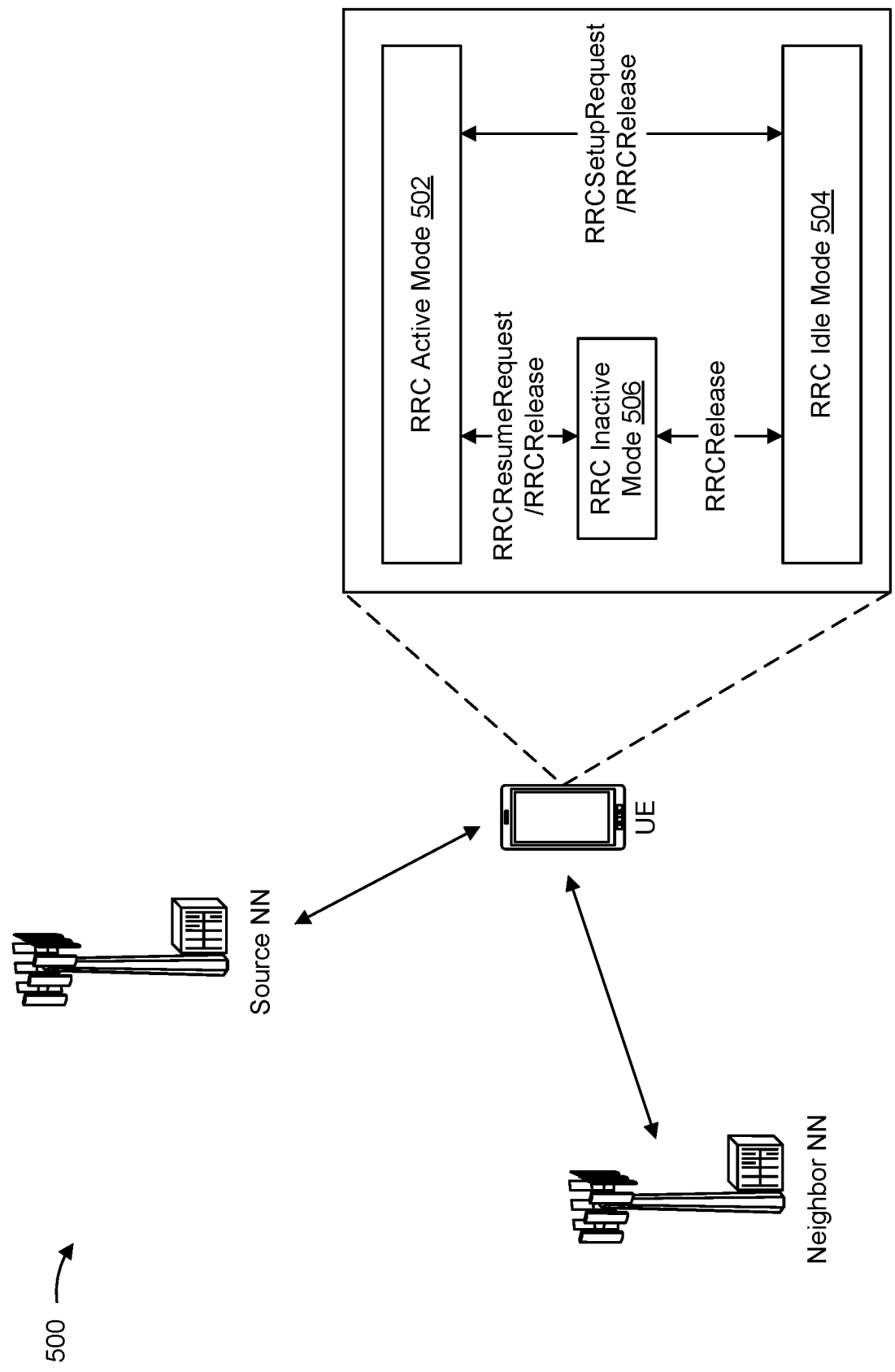
FIG. 5 is a diagram illustrating an example of one or more radio resource control states in which a UE may be configured to obtain neighbor cell measurements, in accordance with the present disclosure.

FIG. 5 is a diagram illustrating an example 500 of one or more RRC states in which a UE (e.g., UE 120 and/or UE 405) may be configured to obtain neighbor cell measurements, in accordance with the present disclosure. As shown in FIG. 5, the UE may be communicatively connected with a source network node (e.g., source network node 410) in a wireless network. Furthermore, in some aspects, the UE may be located within or near the coverage area of one or more neighbor network nodes (e.g., target network node(s) 415).

As shown in FIG. 5, the UE may support a connected communication mode (e.g., an RRC active or RRC connected mode 502), an idle communication mode (e.g., an RRC idle mode 504), and an inactive communication mode (e.g., an RRC inactive mode 506). The RRC inactive mode 506 may functionally reside between the RRC active mode 502 and the RRC idle mode 504.

The UE may transition between different modes based at least in part on various commands and/or communications received from the source network node. For example, the UE may transition from the RRC active mode 502 or the RRC inactive mode 506 to the RRC idle mode 504 based at least in part on receiving an RRCRelease communication from the source network node. As another example, the UE may transition from the RRC active mode 502 to the RRC inactive mode 506 based at least in part on receiving an RRCRelease communication with a suspendConfig parameter from the source network node. As another example, the UE may transition from the RRC idle mode 504 to the RRC active mode 502 based at least in part on receiving an RRCSetupRequest communication from the source network node. As another example, the UE may transition from the RRC inactive mode 506 to the RRC active mode 502 based at least in part on receiving an RRCResumeRequest communication from the source network node.

When transitioning to the RRC inactive mode 506, the UE and/or the source network node may store a UE context (e.g., an access stratum (AS) context and/or higher-layer configurations). This permits the UE and/or the source network node to apply the stored UE context when the UE transitions from the RRC inactive mode 506 to the RRC active mode 502 in order to resume communications with the source network node, which reduces latency of transitioning to the RRC active mode 502 relative to transitioning to the RRC active mode 502 from the RRC idle mode 504. Additionally, or alternatively, the source network node may provide the stored UE context to the neighbor network node to facilitate a handover for the UE, as described in further detail elsewhere herein.

In some cases, the UE may communicatively connect with a new source network node when transitioning from the RRC idle mode 504 or the RRC inactive mode 506 to the RRC active mode 502 (e.g., the UE may perform cell reselection to the neighbor network node if one or more RRM measurements associated with the source network node or the neighbor network node satisfy a condition).

In all RRC states, the UE may periodically perform RRM measurements on one or more neighbor cells. For example, in some aspects, the source network node may transmit a system information block (SIB) that indicates a set of neighbor cells associated with the source network node, and the UE may perform RRM measurements on the set of neighbor cells indicated in the SIB when the UE is in the RRC idle mode 504 or the RRC inactive mode 506. For example, the set of neighbor cells may be indicated in SIB2, which contains parameters related to intra-frequency, inter-frequency, and/or inter-RAT cell reselection, in SIB3, which contains parameters related to intra-frequency cell reselection only, in SIB4, which contains parameters related to inter-frequency cell reselection only, and/or in in SIB5, which contains parameters related to inter-RAT cell reselection only. In this case, when the UE is in the RRC idle mode 504 or the RRC inactive mode 506, the UE may reselect a neighbor cell associated with the neighbor network node as a new serving cell based on one or more RRM measurements satisfying a condition (e.g., when an RSRP, RSRQ, SINR, or other suitable measurement quantity associated with the neighbor network node satisfies a threshold and/or exceeds an RSRP, RSRP, SINR, or other measurement quantity associated with the source network node, among other examples).

Additionally, or alternatively, in the RRC active mode 502, the source network node may provide a measurement configuration to the UE, and the measurement configuration may indicate one or more neighbor cells that the UE is to measure and/or how often the UE is to measure the one or more neighbor cells indicated in the measurement configuration. Accordingly, in the RRC active mode 502, the UE may send measurement reports to the source network node periodically, on-demand, and/or based on a triggering event (e.g., an RSRP measurement associated with one or more neighbor cells satisfying a configured threshold). In some aspects, as described herein, a source cell (e.g., the source network node) may decide whether and/or when to facilitate a handover for the UE to a new serving cell (e.g., a target cell provided by the neighbor network node) based on the measurement report provided by the UE.

Accordingly, in all RRC states, the UE may perform (e.g., obtain) and report intra-frequency, inter-frequency, and/or inter-RAT neighbor cell measurements in order to support mobility and improved performance for the UE (e.g., to determine whether the UE should perform cell reselection to a neighbor cell in the RRC idle mode 504 or the RRC inactive mode 506 and/or to determine whether to initiate a handover to a neighbor cell that may offer better performance than the UE is experiencing in the source cell in the RRC active mode 502). For example, the source network node and the neighbor network node may be configured to transmit one or more reference signals to be measured (e.g., a synchronization signal block (SSB) and/or a channel state information reference signal (CSI-RS)), and cell reselection and/or handover may be triggered for the UE in cases where one or more measurement quantities associated with the reference signal transmissions satisfy one or more conditions. Furthermore, in an NR network or other wireless network where communications are performed using different directional beams, the source network node and/or the neighbor network node may be configured to transmit the SSB, CSI-RS, and/or other reference signals to be measured across multiple beams.

Accordingly, in cases where the reference signals to be measured are transmitted across multiple beams, the source network node may configure the UE to derive the source cell measurement quantities and the neighbor cell measurement quantities (e.g., RSRP, RSRQ, and/or SINR measurement quantities for the source cell and the neighbor cell) by averaging the source cell and neighbor cell measurement quantities across multiple beams based on one or more measurement consolidation thresholds. For example, the source network node may configure a measurement consolidation threshold (e.g., absThreshSS-BlocksConsolidation) that defines a minimum value that a measurement quantity associated with an SSB beam is required to satisfy in order to be considered for averaging across multiple beams and a parameter (e.g., nrofSS-BlocksToAverage) that defines a maximum number of SSB beam measurement quantities that satisfy the measurement consolidation threshold that can be included in a measurement quantity averaged across multiple beams. For example, if the maximum number of SSB beam measurement quantities to be averaged is four (4) and six (6) out of eight (8) SSB beam measurement quantities satisfy the applicable measurement consolidation threshold, the UE may average the 4 highest SSB beam measurement quantities. Additionally, or alternatively, a similar configuration may be used for averaging measurement quantities for a CSI-RS that is transmitted across multiple beams and/or using different CSI-RS measurement resources. For example, a measurement consolidation threshold (e.g., absThreshCSI-RS-Consolidation) that defines a minimum value that a measurement quantity associated with a CSI-RS beam is required to satisfy in order to be considered for averaging across multiple beams and a parameter (e.g., nrofCSI-RS-ResourcesToAverage) that defines a maximum number of CSI-RS beam measurement quantities that satisfy the measurement consolidation threshold that can be included in a measurement quantity averaged across multiple CSI-RS beams. In general, the parameters that define the measurement consolidation thresholds that must be satisfied to be considered for averaging and the maximum number of measurement quantities to be averaged may be cell-specific or cell-group-specific, and may be transmitted in a SIB (e.g., SIB2 and/or SIB4) for intra-frequency or inter-frequency cell reselection, a MeasIdleConfig information element (IE) for measurements that the UE is to obtain in the RRC idle mode 504 or the RRC inactive mode 506, or a MeasObjectNR IE for measurements that the UE is to obtain in the RRC active mode 502.

Accordingly, in cases where the reference signals to be transmitted across multiple beams, one or more measurement consolidation thresholds may be configured to define the minimum value that an SSB beam or CSI-RS beam measurement quantity has to satisfy in order to be considered for averaging across multiple beams. However, a wireless network typically configures the value(s) associated with the measurement consolidation threshold(s) to guarantee beam quality for a UE that has multiple Rx chains, sometimes referred to as Rx branches or the like. For example, a wireless network may support communication in one or more frequency bands (e.g., time division duplexing (TDD) bands in FR1) in which a UE is required to have a minimum of four (4) Rx antenna ports and/or one or more frequency bands (e.g., frequency division duplexing (FDD) bands in FR1 and/or TDD bands in FR2) in which a UE is required to have a minimum of two (2) Rx antenna ports. Although configuring the value(s) associated with the measurement consolidation threshold(s) may help to guarantee beam quality for a UE that has 2 or 4 (or more) Rx chains, the value(s) of the measurement consolidation threshold(s) may be unsuitable in cases where the UE is in a reduced capability (RedCap) category, referred to herein as a RedCap UE.

For example, use cases for a RedCap UE may include wearable devices, industrial wireless sensor networks (IWSN), surveillance cameras, and/or low-end smartphones, among other examples, which may generally have a reduced feature set or less advanced capabilities relative to a premium UE or a legacy UE. For example, relative to a premium UE or a legacy UE, a RedCap UE may support a lower maximum MCS (e.g., QPSK as compared to 256-QAM), may support a lower transmit power, may have a less advanced beamforming capability, may have a smaller maximum bandwidth, may have fewer antennas (e.g., transmit antennas and/or receive antennas) and/or antenna ports, may be restricted to half-duplex communication, and/or may have a lower power class. Furthermore, whereas a premium UE or a legacy UE is generally required to have at least 2 Rx chains, a minimum number of Rx chains may be reduced for a RedCap UE. For example, for frequency bands where a premium or legacy UE is required to be equipped with a minimum of 2 Rx antenna ports and/or frequency bands where a premium or legacy UE (other than a vehicular UE with 2 Rx chains) is required to be equipped with a minimum of 4 Rx antenna ports, one (1) is the minimum number of Rx chains required for a RedCap UE (although a RedCap UE may have 2 Rx chains). Accordingly, because standards applied in a wireless network are defined to ensure coexistence between RedCap UE and non-RedCap (e.g., premium or legacy) UEs, a RedCap UE with one (1) Rx chain must coexist with RedCap UEs and non-RedCap UEs with multiple Rx chains, which can pose challenges with respect to configuring the measurement consolidation threshold(s) that define which beam measurement quantities are eligible to be considered for averaging across multiple beams.

For example, in existing wireless networks, only single values are configured for a measurement consolidation threshold (e.g., in an absThreshSS-BlocksConsolidation parameter and/or an absThreshCSI-RS-Consolidation parameter) based on the expected performance capabilities for a UE that has two or more Rx chains. As a result, a RedCap UE with a single Rx chain or only one Rx chain (which may be referred to herein as a "1Rx UE") may be unable to obtain any beam measurements that satisfy the required measurement consolidation thresholds due to performance degradation caused by a lack of receive diversity. Furthermore, any reduction in the values for the measurement consolidation thresholds to accommodate the performance capabilities of a 1Rx UE may adversely affect performance for UEs with multiple Rx chains because the lower threshold(s) may be unable to guarantee the beam quality needed for UEs with multiple Rx chains. Accordingly, some aspects described herein relate to techniques to configure values for one or more measurement consolidation thresholds that are used only by 1Rx UEs such that a 1Rx UE may average beam measurement quantities across multiple beams without causing degraded beam performance for UEs with multiple Rx chains.

As indicated above, FIG. 5 is provided as an example. Other examples may differ from what is described with regard to FIG. 5.

Figure 6:
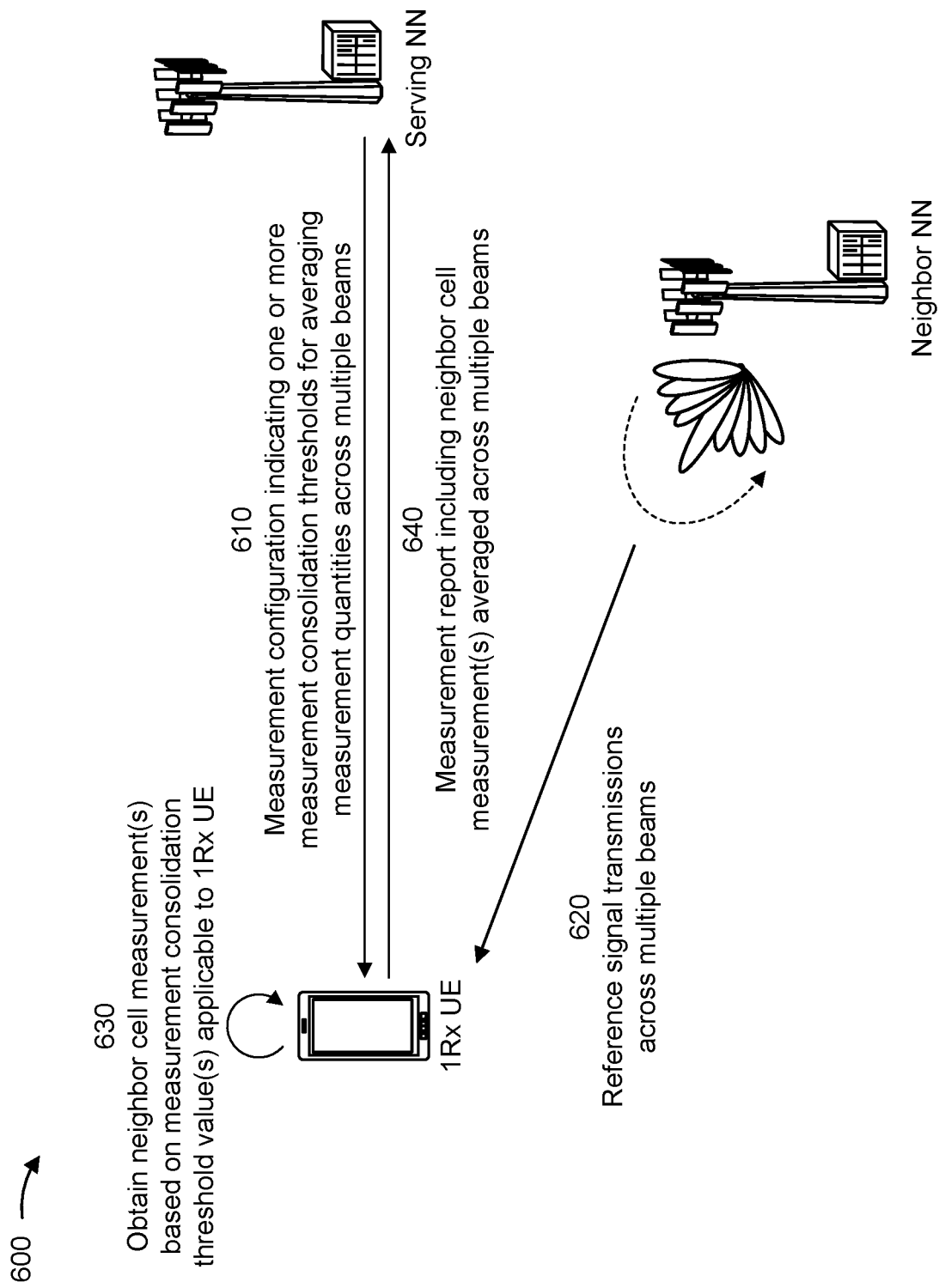
FIG. 6 is a diagram illustrating an example associated with associated with measurement consolidation thresholds for a reduced capacity (RedCap) UE, in accordance with the present disclosure.

FIG. 6 is a diagram illustrating an example associated with measurement consolidation thresholds for a RedCap UE, in accordance with the present disclosure. As shown in FIG. 6, example 600 includes communication between a UE (e.g., UE 120), a serving network node (e.g., network node 110) for the UE, and a neighbor network node (e.g., network node 110) that transmits one or more reference signals that the UE is to measure (e.g., to support mobility, cell reselection, and/or handover). In some aspects, the UE, the serving network node, and the neighbor network node may be included in a wireless network, such as wireless network 100. The serving network node and the UE may communicate via a wireless access link, which may include an uplink and a downlink. In some aspects, as described herein, the UE may be a RedCap UE with one (1) Rx chain (e.g., a 1Rx UE), the serving network node may be referred to as a serving cell, and the neighbor network node may be referred to as a neighbor cell.

As shown in FIG. 6, and by reference number 610, the serving network node may transmit, and the 1Rx UE may receive, a measurement configuration that indicates one or more measurement consolidation thresholds for averaging measurement quantities across multiple beams. As described herein, a measurement consolidation threshold may generally define an absolute threshold for consolidating measurement results for one or more reference signal transmissions (e.g., SSB and/or CSI-RS transmissions) across multiple beams (e.g., an absolute threshold that a reference signal measurement quantity is required to satisfy in order to be averaged within a consolidated neighbor cell measurement). For example, the serving network node may configure a measurement consolidation threshold for a measurement quantity (e.g., an RSRP, RSRQ, and/or SINR measurement quantity), where measurement quantities having values that satisfy (e.g., exceed) the measurement consolidation threshold are used as inputs to derive cell measurement results. Accordingly, because a 1Rx UE may generally experience degraded reception performance due to a lack of receive diversity relative to a UE that has more than one Rx chain, the measurement configuration provided by the serving network node may enable the 1Rx UE to determine a measurement consolidation threshold to be applied when obtaining one or more neighbor cell measurements associated with one or more neighboring network nodes.

For example, for a UE with multiple Rx chains (e.g., two or four Rx chains), a measurement configuration that indicates one or more measurement consolidation thresholds and a maximum number of beam measurement quantities to be averaged is generally indicated in SIB2 or SIB4 for intra-frequency or inter-frequency cell reselection, a MeasIdleConfig IE for neighbor cell measurements obtained in RRC idle or RRC inactive states, or a MeasObjectNR IE for intra-frequency or inter-frequency neighbor cell measurements obtained in an RRC connected state. Accordingly, in some aspects, the serving cell may configure separate measurement consolidation thresholds for 1Rx UEs and UEs with multiple Rx chains. For example, in some aspects, the measurement configuration transmitted by the serving network node may indicate a parameter (e.g., absThreshSS-BlocksConsolidation) to define a measurement consolidation threshold that an SSB beam measurement quantity is required to exceed or otherwise satisfy in order to be considered for averaging across multiple beams by a UE with multiple Rx chains, and the measurement configuration may indicate a separate parameter (e.g., absThreshSS-BlocksConsolidation1Rx) to define a measurement consolidation threshold that an SSB beam measurement quantity is required to exceed or otherwise satisfy in order to be considered for averaging across multiple beams by a 1Rx UE. Additionally, or alternatively, the measurement configuration may indicate a parameter (e.g., absThreshCSI-RS-Consolidation) to define a measurement consolidation threshold that a CSI-RS beam measurement quantity is required to exceed or otherwise satisfy to be considered for averaging by a UE with multiple Rx chains, and the measurement configuration may indicate a separate parameter (e.g., absThreshCSI-RS-Consolidation1Rx) to define a measurement consolidation threshold that a CSI-RS beam measurement quantity is required to exceed or otherwise satisfy in order to be considered for averaging across multiple beams by a 1Rx UE. Furthermore, because a maximum bandwidth for a RedCap UE may be reduced relative to a premium or legacy UE (e.g., to 5 MHz), different measurement quantities may potentially have different estimation accuracies depending on the maximum bandwidth of the 1Rx UE. Accordingly, in some aspects, the measurement configuration provided by the serving network node may indicate separate measurement consolidation thresholds for different measurement quantity types (e.g., measurement consolidation thresholds for RSRP, RSRQ, and/or SINR measurement quantities may be separately configured for averaging SSB beam measurements and/or CSI-RS beam measurements).

Alternatively, rather than configuring separate measurement consolidation thresholds for 1Rx UEs and UEs with multiple Rx chains, the serving network node may configure one or more measurement consolidation thresholds only for UEs with multiple Rx chains, and the measurement consolidation threshold(s) applied by 1Rx UEs may be offset from the measurement consolidation threshold(s) configured for UEs with multiple Rx chains. For example, the measurement configuration provided by the serving network node may indicate the measurement consolidation threshold that a beam measurement quantity is required to satisfy to be considered for averaging across multiple beams by a UE with multiple Rx chains (e.g., using an absThreshSS-BlocksConsolidation parameter and/or an absThreshCSI-RS-Consolidation parameter) and an offset to be applied by a 1Rx UE. In this case, the 1Rx UE may determine the corresponding measurement consolidation threshold that must be satisfied to be considered for averaging by the 1Rx UE (e.g., absThreshSS-BlocksConsolidation1Rx or absThreshCSI-RS-Consolidation-1Rx) by adding the offset (which may be a negative value) to the measurement consolidation threshold configured for a UE with multiple Rx chains (e.g., absThreshSS- BlocksConsolidation1Rx=absThreshSS-BlocksConsolidation+offset, or absThreshCSI-RS-Consolidation-1Rx=absThreshCSI-RS-Consolidation+offset).

Furthermore, because the measurement consolidation threshold(s) for UEs with multiple Rx chains can be configured separately for different measurement quantities (e.g., RSRP, RSRQ, and/or SINR measurement quantities), the measurement configuration provided by the serving network node may indicate separate offsets for each measurement quantity type.

In some aspects, in cases where the offset(s) applied by the 1Rx UE are indicated in the measurement configuration, the serving network node may signal the offsets using system information and/or RRC messages. For example, the serving network node may indicate the value(s) of the offset(s) that a 1Rx UE is to apply to the measurement consolidation threshold(s) configured for UEs with multiple Rx chains. Additionally, or alternatively, the serving network node may indicate one offset value from a predefined set of possible values for the offset. Additionally, or alternatively, a set of fixed offset values may be defined in one or more wireless communication standards (e.g., TS 38.133), where the fixed offset values may be used by the 1Rx UE in cases where the serving network node does not configure the offset(s). For example, the serving network node may configure only the measurement consolidation threshold(s) applicable to UEs with multiple Rx chains, and any 1Rx UEs may determine the measurement consolidation threshold(s) applicable to the 1Rx UEs by adding the appropriate fixed offset value that is defined in the wireless communication standard to the measurement consolidation threshold configured by the serving network node.

Accordingly, using the techniques described herein, the 1Rx UE may obtain one or more neighbor cell measurements that are averaged across multiple beams based on one or more values for one or more measurement consolidation thresholds that are applicable to 1Rx UEs. For example, as shown by reference number 620, the neighbor cell may transmit one or more reference signals across multiple beams (e.g., an SSB and/or a CSI-RS may be transmitted in one or more beam sweeps). Accordingly, as shown by reference number 630, the 1Rx UE may obtain one or more neighbor cell measurements based on a value of the measurement consolidation threshold for the 1Rx UE. For example, in cases where the neighbor network node transmits an SSB across multiple beams, the 1Rx UE may obtain multiple measurements of the SSB, and any of the measurements that exceed an absThreshSS-BlocksConsolidation1Rx measurement consolidation threshold may be considered eligible for averaging. As described herein, the value for the absThreshSS-BlocksConsolidation1Rx parameter may be separately configured by the serving network node, or the value may be determined based on a configured offset or a specified offset from an absThreshSS-BlocksConsolidation parameter configured for UEs with multiple Rx chains. Additionally, or alternatively, in cases where the neighbor network node transmits a CSI-RS across multiple beams, the 1Rx UE may obtain multiple measurements of the CSI-RS transmission, and any of the measurements that exceed an absThreshCSI-RS-Consolidation1Rx measurement consolidation threshold may be considered eligible for averaging. As described herein, the absThreshCSI-RS-Consolidation1Rx parameter may be separately configured by the serving network node, or the value may be determined based on a configured offset or a specified offset from an absThreshCSI-RS-Consolidation parameter configured for UEs with multiple Rx chains.

In either case, the 1Rx UE may include up to the maximum number of measurement quantities that satisfy the measurement consolidation threshold(s) in the averaged measurement quantity (e.g., based on a nrofSS-BlocksToAverage parameter and/or a nrofCSI-RS-ResourcesToAverage parameter), whereby one or more mobility actions may be triggered for the 1Rx UE when the averaged measurement quantity satisfies a condition (e.g., the 1Rx UE may perform cell reselection or a handover may be triggered for the 1Rx UE when the measurement quantity that is averaged based on the measurement consolidation threshold(s) specific to 1Rx UEs satisfies a condition). For example, as shown by reference number 640, the 1Rx UE may transmit, and the serving network node may receive, a measurement report that includes the neighbor cell measurement that is averaged across multiple beams, where individual reference signal measurement quantities that are averaged in the neighbor cell measurement may each satisfy the applicable measurement consolidation threshold for 1Rx UEs such that cell reselection or handover may be triggered for the 1Rx UE when the consolidated neighbor cell measurement included in the measurement report satisfies one or more conditions.

As indicated above, FIG. 6 is provided as an example. Other examples may differ from what is described with regard to FIG. 6.

Figure 7:
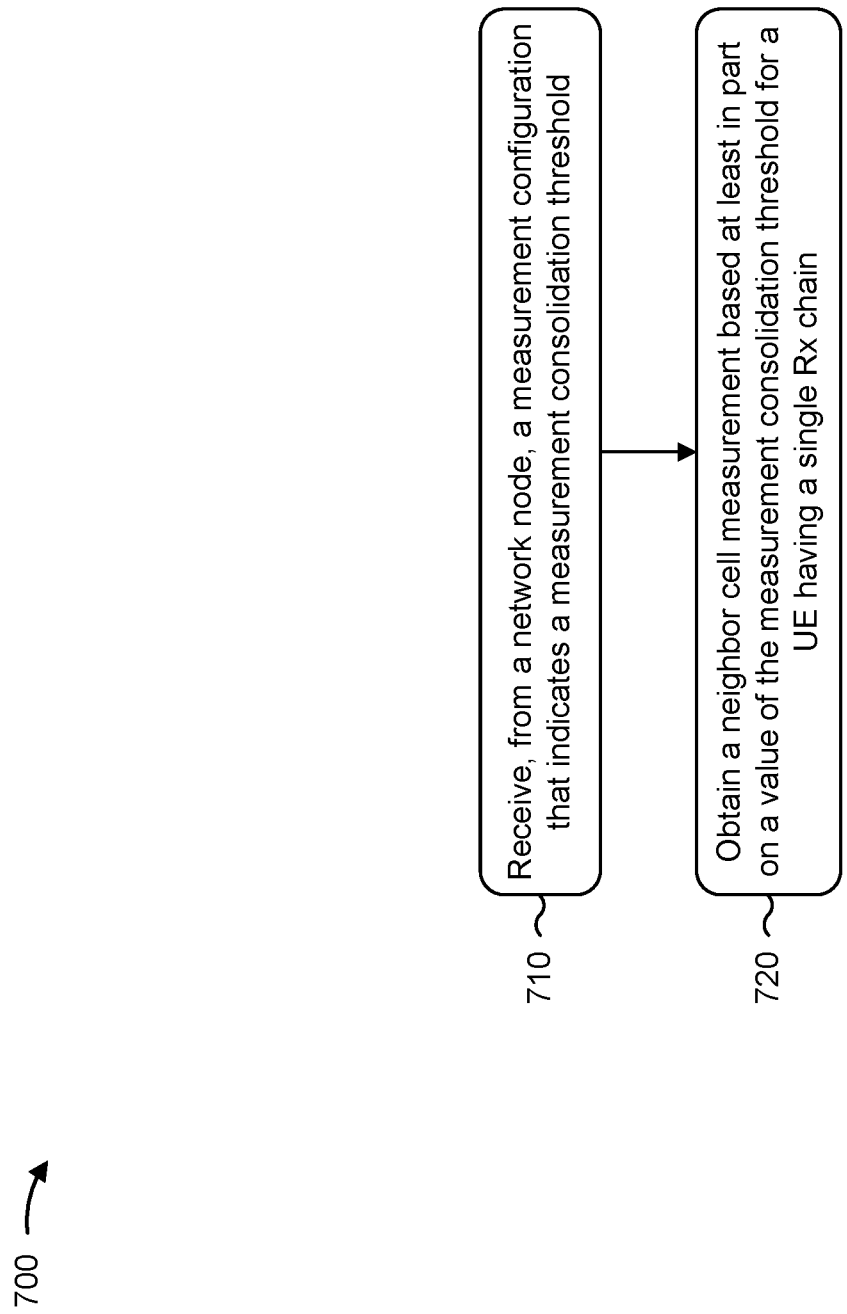
FIGS. 7-8 are diagrams illustrating example processes associated with measurement consolidation thresholds for a RedCap UE, in accordance with the present disclosure.

FIG. 7 is a diagram illustrating an example process 700 performed, for example, by a UE, in accordance with the present disclosure. Example process 700 is an example where the UE (e.g., UE 120, UE 405, the 1Rx UE illustrated in FIG. 6, or the like) performs operations associated with measurement consolidation thresholds for a RedCap UE.

As shown in FIG. 7, in some aspects, process 700 may include receiving, from a network node, a measurement configuration that indicates a measurement consolidation threshold (block 710). For example, the UE (e.g., using communication manager 140 and/or reception component 902, depicted in FIG. 9) may receive, from a network node, a measurement configuration that indicates a measurement consolidation threshold, as described above.

As further shown in FIG. 7, in some aspects, process 700 may include obtaining a neighbor cell measurement based at least in part on a value of the measurement consolidation threshold for a UE having a single Rx chain (block 720). For example, the UE (e.g., using communication manager 140 and/or measurement component 908, depicted in FIG. 9) may obtain a neighbor cell measurement based at least in part on a value of the measurement consolidation threshold for a UE having a single Rx chain, as described above.

Process 700 may include additional aspects, such as any single aspect or any combination of aspects described below and/or in connection with one or more other processes described elsewhere herein.

In a first aspect, the measurement configuration indicates the value of the measurement consolidation threshold for a UE having a single Rx chain.

In a second aspect, alone or in combination with the first aspect, the measurement configuration indicates a value of the measurement consolidation threshold for a UE having multiple Rx chains, and the value of the measurement consolidation threshold for a UE having a single Rx chain is based at least in part on an offset from the value of the measurement consolidation threshold for a UE having multiple Rx chains.

In a third aspect, alone or in combination with one or more of the first and second aspects, the measurement configuration indicates a value of the offset.

In a fourth aspect, alone or in combination with one or more of the first through third aspects, the measurement configuration indicates a value of the offset from a set that includes multiple possible values for the offset.

In a fifth aspect, alone or in combination with one or more of the first through fourth aspects, a value of the offset is predefined.

In a sixth aspect, alone or in combination with one or more of the first through fifth aspects, the value of the measurement consolidation threshold is associated with an RSRP measurement, an RSRQ measurement, or a SINR measurement.

In a seventh aspect, alone or in combination with one or more of the first through sixth aspects, the value of the measurement consolidation threshold indicates a minimum SSB beam measurement quantity to be considered for averaging across multiple SSB beams for a UE having a single Rx chain.

In an eighth aspect, alone or in combination with one or more of the first through seventh aspects, the value of the measurement consolidation threshold indicates a minimum CSI-RS beam measurement quantity to be considered for averaging across multiple CSI-RS beams for a UE having a single Rx chain.

In a ninth aspect, alone or in combination with one or more of the first through eighth aspects, the measurement consolidation threshold is an absolute threshold that a reference signal measurement quantity is required to satisfy in order to be averaged within the neighbor cell measurement.

In a tenth aspect, alone or in combination with one or more of the first through ninth aspects, the measurement configuration is indicated in one or more SIBs for intra-frequency cell reselection or inter-frequency cell reselection.

In an eleventh aspect, alone or in combination with one or more of the first through tenth aspects, the measurement configuration is indicated in an IE associated with one or more measurements that the UE is to obtain in a RRC idle state or an RRC inactive state.

In a twelfth aspect, alone or in combination with one or more of the first through eleventh aspects, the measurement configuration is indicated in an IE associated with one or more measurements that the UE is to obtain in a RRC connected state.

In a thirteenth aspect, process 700 includes transmitting, to the network node, a measurement report that includes the neighbor cell measurement that is based at least in part on the value of the measurement consolidation threshold for a UE having a single Rx chain.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
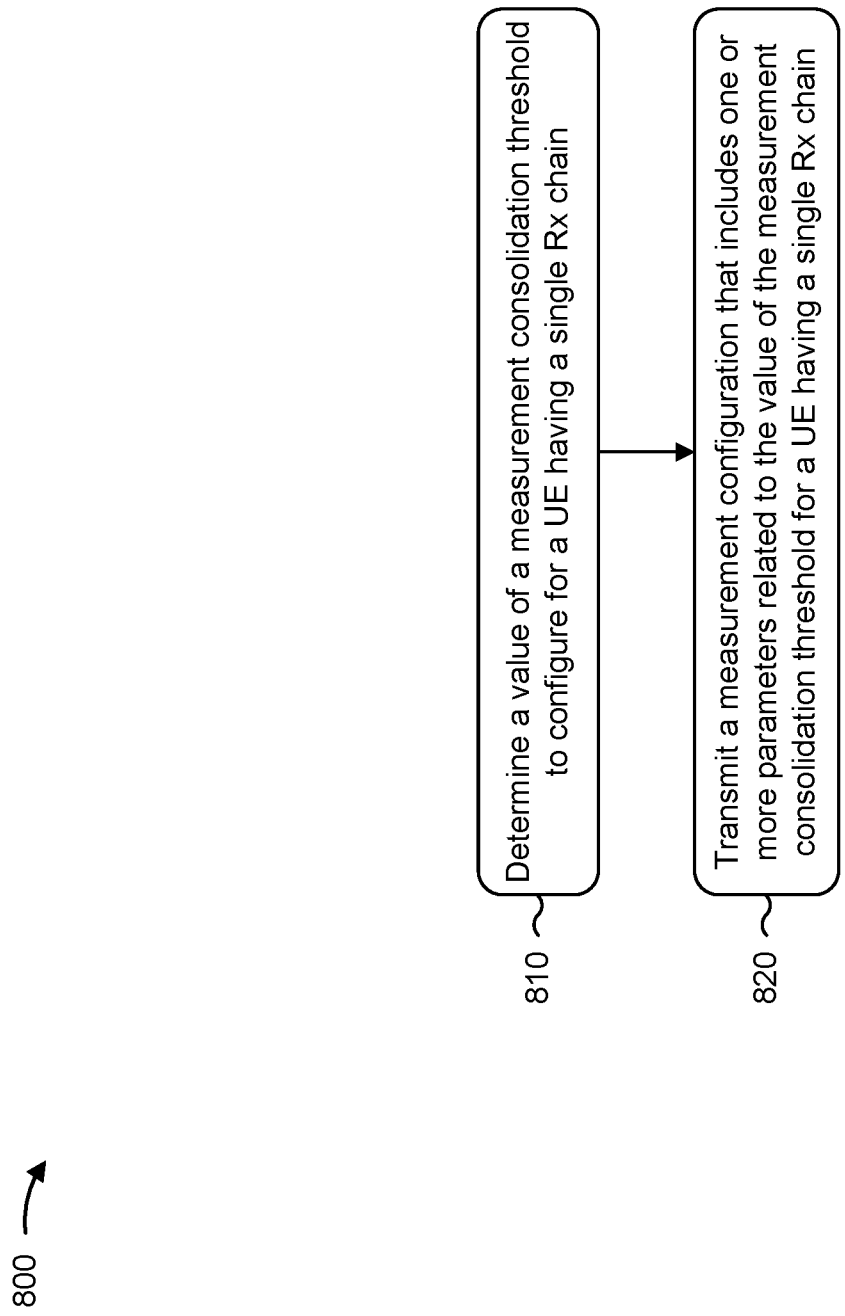

FIG. 8 is a diagram illustrating an example process 800 performed, for example, by a network node, in accordance with the present disclosure. Example process 800 is an example where the network node (e.g., network node 110, serving network node 410, the serving network node shown in FIG. 6, or the like) performs operations associated with measurement consolidation thresholds for a RedCap UE.

As shown in FIG. 8, in some aspects, process 800 may include determining a value of a measurement consolidation threshold to configure for a UE having a single Rx chain (block 810). For example, the network node (e.g., using communication manager 150 and/or configuration component 1008, depicted in FIG. 10) may determine a value of a measurement consolidation threshold to configure for a UE having a single Rx chain, as described above.

As further shown in FIG. 8, in some aspects, process 800 may include transmitting a measurement configuration that includes one or more parameters related to the value of the measurement consolidation threshold for a UE having a single Rx chain (block 820). For example, the network node (e.g., using communication manager 150 and/or transmission component 1004, depicted in FIG. 10) may transmit a measurement configuration that includes one or more parameters related to the value of the measurement consolidation threshold for a UE having a single Rx chain, as described above.

Process 800 may include additional aspects, such as any single aspect or any combination of aspects described below and/or in connection with one or more other processes described elsewhere herein.

In a first aspect, the one or more parameters included in the measurement configuration indicate the value of the measurement consolidation threshold for a UE having a single Rx chain.

In a second aspect, alone or in combination with the first aspect, the one or more parameters included in the measurement configuration indicate a value of the measurement consolidation threshold for a UE having multiple Rx chains, and the value of the measurement consolidation threshold for a UE having a single Rx chain is based at least in part on an offset from the value of the measurement consolidation threshold for a UE having multiple Rx chains.

In a third aspect, alone or in combination with one or more of the first and second aspects, the one or more parameters included in the measurement configuration indicate a value of the offset.

In a fourth aspect, alone or in combination with one or more of the first through third aspects, the one or more parameters included in the measurement configuration indicate a value of the offset from a set that includes multiple possible values for the offset.

In a fifth aspect, alone or in combination with one or more of the first through fourth aspects, a value of the offset is predefined.

In a sixth aspect, alone or in combination with one or more of the first through fifth aspects, the value of the measurement consolidation threshold is associated with an RSRP measurement, an RSRQ measurement, or a SINR measurement.

In a seventh aspect, alone or in combination with one or more of the first through sixth aspects, the value of the measurement consolidation threshold indicates a minimum SSB beam measurement quantity to be considered for averaging across multiple SSB beams for a UE having a single Rx chain.

In an eighth aspect, alone or in combination with one or more of the first through seventh aspects, the value of the measurement consolidation threshold indicates a minimum CSI-RS beam measurement quantity to be considered for averaging across multiple CSI-RS beams for a UE having a single Rx chain.

In a ninth aspect, alone or in combination with one or more of the first through eighth aspects, the measurement consolidation threshold is an absolute threshold that a reference signal measurement quantity is required to satisfy in order to be averaged within the neighbor cell measurement.

In a tenth aspect, alone or in combination with one or more of the first through ninth aspects, the measurement configuration is indicated in one or more SIBs for intra-frequency cell reselection or inter-frequency cell reselection.

In an eleventh aspect, alone or in combination with one or more of the first through tenth aspects, the measurement configuration is indicated in an IE associated with one or more measurements that the UE is to obtain in a RRC idle state or an RRC inactive state.

In a twelfth aspect, alone or in combination with one or more of the first through eleventh aspects, the measurement configuration is indicated in an IE associated with one or more measurements that the UE is to obtain in a RRC connected state.

In a thirteenth aspect, alone or in combination with one or more of the first through twelfth aspects, process 700 includes receiving, from a UE having a single Rx chain, a measurement report that includes the neighbor cell measurement that is based at least in part on the value of the measurement consolidation threshold for a UE having a single Rx chain.

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
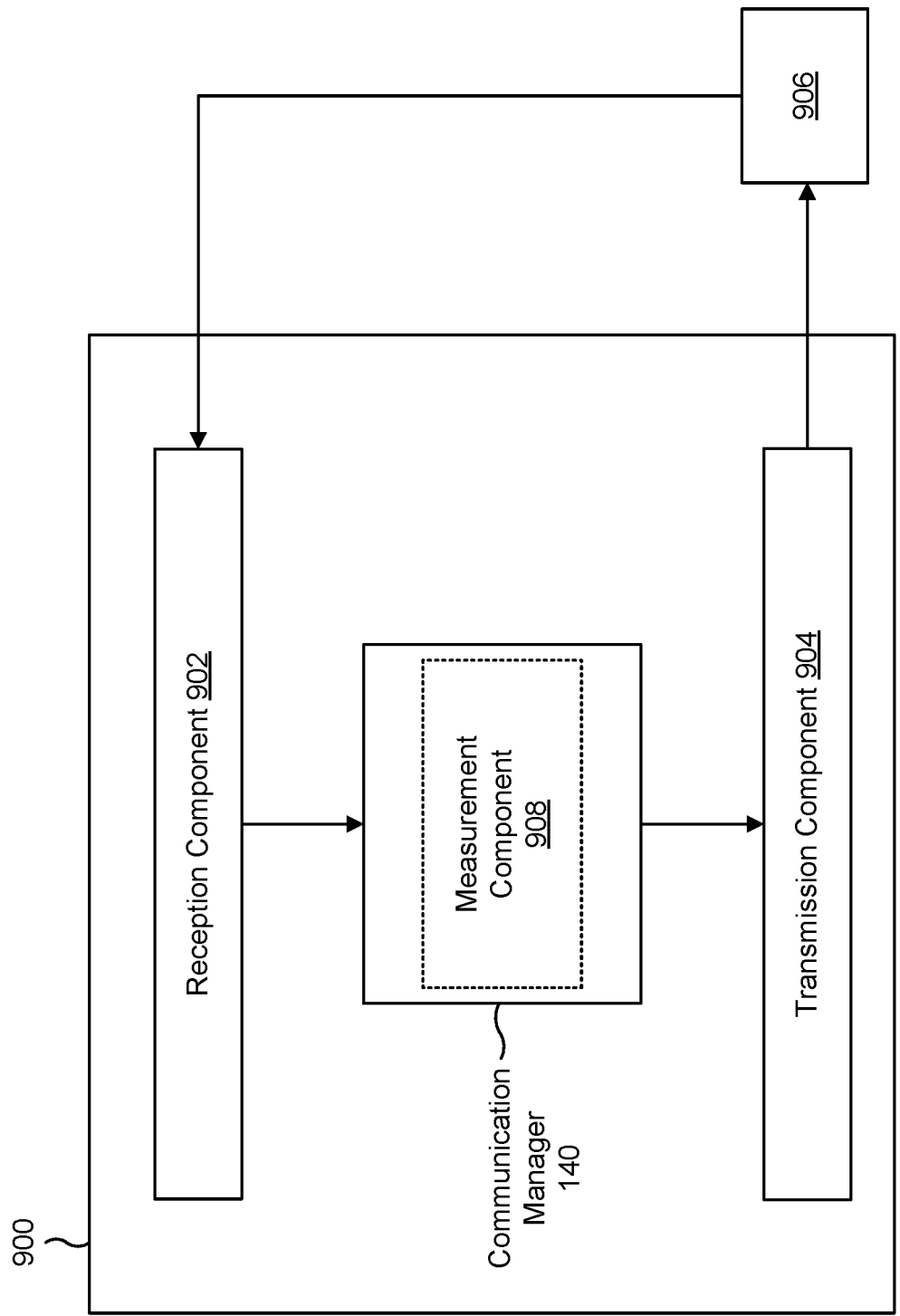
FIGS. 9-10 are diagrams of example apparatuses for wireless communication, in accordance with the present disclosure.

FIG. 9 is a diagram of an example apparatus 900 for wireless communication. The apparatus 900 may be a UE, or a UE may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a network node, or another wireless communication device) using the reception component 902 and the transmission component 904. As further shown, the apparatus 900 may include the communication manager 140. The communication manager 140 may include a measurement component 908, among other examples.

In some aspects, the apparatus 900 may be configured to perform one or more operations described herein in connection with FIG. 6. Additionally, or alternatively, the apparatus 900 may be configured to perform one or more processes described herein, such as process 700 of FIG. 7. In some aspects, the apparatus 900 and/or one or more components shown in FIG. 9 may include one or more components of the UE described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the UE described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the UE described in connection with FIG. 2. In some aspects, the transmission component 904 may be co-located with the reception component 902 in a transceiver.

The reception component 902 may receive, from a network node, a measurement configuration that indicates a measurement consolidation threshold. The measurement component 908 may obtain a neighbor cell measurement based at least in part on a value of the measurement consolidation threshold for a UE having a single Rx chain.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

Figure 10:
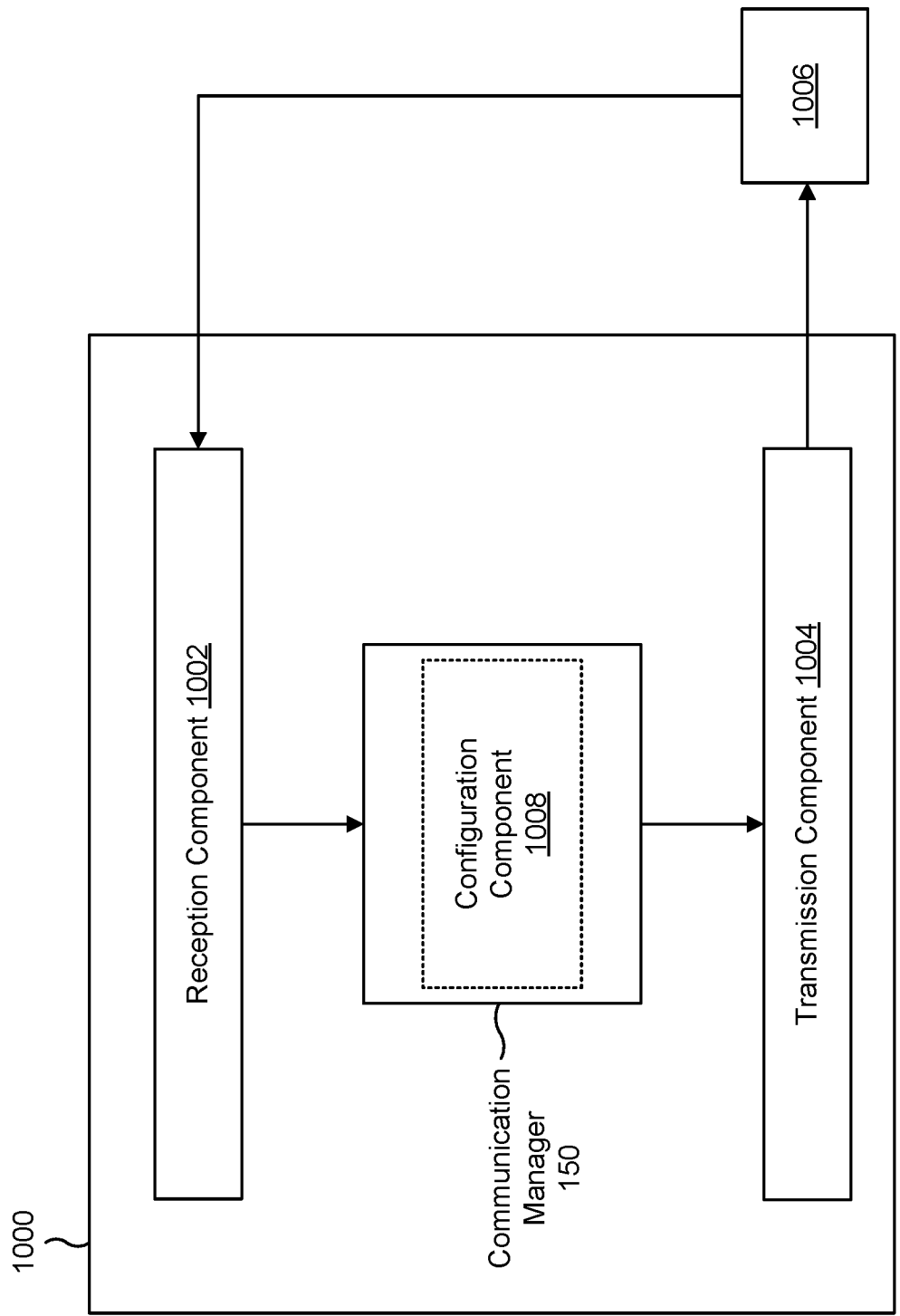

FIG. 10 is a diagram of an example apparatus 1000 for wireless communication. The apparatus 1000 may be a network node, or a network node may include the apparatus 1000. In some aspects, the apparatus 1000 includes a reception component 1002 and a transmission component 1004, which may be in communication with one another (for example, via one or more buses and/or one or more other components). As shown, the apparatus 1000 may communicate with another apparatus 1006 (such as a UE, a network node, or another wireless communication device) using the reception component 1002 and the transmission component 1004. As further shown, the apparatus 1000 may include the communication manager 150. The communication manager 150 may include a configuration component 1008, among other examples.

In some aspects, the apparatus 1000 may be configured to perform one or more operations described herein in connection with FIG. 6. Additionally, or alternatively, the apparatus 1000 may be configured to perform one or more processes described herein, such as process 800 of FIG. 8. In some aspects, the apparatus 1000 and/or one or more components shown in FIG. 10 may include one or more components of the network node described in connection with FIG. 2. Additionally, or alternatively, one or more components shown in FIG. 10 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1002 may receive communications, such as reference signals, control information, data communications, or a combination thereof, from the apparatus 1006. The reception component 1002 may provide received communications to one or more other components of the apparatus 1000. In some aspects, the reception component 1002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1000. In some aspects, the reception component 1002 may include one or more antennas, a modem, a demodulator, a MIMO detector, a receive processor, a controller/processor, a memory, or a combination thereof, of the network node described in connection with FIG. 2.

The transmission component 1004 may transmit communications, such as reference signals, control information, data communications, or a combination thereof, to the apparatus 1006. In some aspects, one or more other components of the apparatus 1000 may generate communications and may provide the generated communications to the transmission component 1004 for transmission to the apparatus 1006. In some aspects, the transmission component 1004 may perform signal processing on the generated communications (such as filtering, amplification, modulation, digital-to-analog conversion, multiplexing, interleaving, mapping, or encoding, among other examples), and may transmit the processed signals to the apparatus 1006. In some aspects, the transmission component 1004 may include one or more antennas, a modem, a modulator, a transmit MIMO processor, a transmit processor, a controller/processor, a memory, or a combination thereof, of the network node described in connection with FIG. 2. In some aspects, the transmission component 1004 may be co-located with the reception component 1002 in a transceiver.

The configuration component 1008 may determine a value of a measurement consolidation threshold to configure for a UE having a single Rx chain. The transmission component 1004 may transmit a measurement configuration that includes one or more parameters related to the value of the measurement consolidation threshold for a UE having a single Rx chain.

The number and arrangement of components shown in FIG. 10 are provided as an example. In practice, there may be additional components, fewer components, different components, or differently arranged components than those shown in FIG. 10. Furthermore, two or more components shown in FIG. 10 may be implemented within a single component, or a single component shown in FIG. 10 may be implemented as multiple, distributed components. Additionally, or alternatively, a set of (one or more) components shown in FIG. 10 may perform one or more functions described as being performed by another set of components shown in FIG. 10.

The following provides an overview of some Aspects of the present disclosure:

Aspect 1: A method of wireless communication performed by a UE, comprising: receiving, from a network node, a measurement configuration that indicates a measurement consolidation threshold; and obtaining a neighbor cell measurement based at least in part on a value of the measurement consolidation threshold for a UE having a single Rx chain.

Aspect 2: The method of Aspect 1, wherein the measurement configuration indicates the value of the measurement consolidation threshold for a UE having a single Rx chain.

Aspect 3: The method of Aspect 1, wherein the measurement configuration indicates a value of the measurement consolidation threshold for a UE having multiple Rx chains, and wherein the value of the measurement consolidation threshold for a UE having a single Rx chain is based at least in part on an offset from the value of the measurement consolidation threshold for a UE having multiple Rx chains.

Aspect 4: The method of Aspect 3, wherein the measurement configuration indicates a value of the offset.

Aspect 5: The method of any of Aspects 3-4, wherein the measurement configuration indicates a value of the offset from a set that includes multiple possible values for the offset.

Aspect 6: The method of any of Aspects 3-5, wherein a value of the offset is predefined.

Aspect 7: The method of any of Aspects 1-6, wherein the value of the measurement consolidation threshold is associated with an RSRP measurement, an RSRQ measurement, or a SINR measurement.

Aspect 8: The method of any of Aspects 1-7, wherein the value of the measurement consolidation threshold indicates a minimum SSB beam measurement quantity to be considered for averaging across multiple SSB beams for a UE having a single Rx chain.

Aspect 9: The method of any of Aspects 1-8, wherein the value of the measurement consolidation threshold indicates a minimum CSI-RS beam measurement quantity to be considered for averaging across multiple CSI-RS beams for a UE having a single Rx chain.

Aspect 10: The method of any of Aspects 1-9, wherein the measurement consolidation threshold is an absolute threshold that a reference signal measurement quantity is required to satisfy in order to be averaged within the neighbor cell measurement.

Aspect 11: The method of any of Aspects 1-10, wherein the measurement configuration is indicated in one or more SIBs for intra-frequency cell reselection or inter-frequency cell reselection.

Aspect 12: The method of any of Aspects 1-11, wherein the measurement configuration is indicated in an IE associated with one or more measurements that the UE is to obtain in a RRC idle state or an RRC inactive state.

Aspect 13: The method of any of Aspects 1-12, wherein the measurement configuration is indicated in an IE associated with one or more measurements that the UE is to obtain in a RRC connected state.

Aspect 14: The method of any of Aspects 1-13, further comprising: transmitting, to the network node, a measurement report that includes the neighbor cell measurement that is based at least in part on the value of the measurement consolidation threshold for a UE having a single Rx chain.

Aspect 15: A method of wireless communication performed by a network node, comprising: determining a value of a measurement consolidation threshold to configure for a UE having a single Rx chain; and transmitting a measurement configuration that includes one or more parameters related to the value of the measurement consolidation threshold for a UE having a single Rx chain.

Aspect 16: The method of Aspect 15, wherein the one or more parameters included in the measurement configuration indicate the value of the measurement consolidation threshold for a UE having a single Rx chain.

Aspect 17: The method of Aspect 15, wherein the one or more parameters included in the measurement configuration indicate a value of the measurement consolidation threshold for a UE having multiple Rx chains, and wherein the value of the measurement consolidation threshold for a UE having a single Rx chain is based at least in part on an offset from the value of the measurement consolidation threshold for a UE having multiple Rx chains.

Aspect 18: The method of Aspect 17, wherein the one or more parameters included in the measurement configuration indicate a value of the offset.

Aspect 19: The method of any of Aspects 17-18, wherein the one or more parameters included in the measurement configuration indicate a value of the offset from a set that includes multiple possible values for the offset.

Aspect 20: The method of any of Aspects 17-19, wherein a value of the offset is predefined.

Aspect 21: The method of any of Aspects 15-20, wherein the value of the measurement consolidation threshold is associated with an RSRP measurement, an RSRQ measurement, or a SINR measurement.

Aspect 22: The method of any of Aspects 15-21, wherein the value of the measurement consolidation threshold indicates a minimum SSB beam measurement quantity to be considered for averaging across multiple SSB beams for a UE having a single Rx chain.

Aspect 23: The method of any of Aspects 15-22, wherein the value of the measurement consolidation threshold indicates a minimum CSI-RS beam measurement quantity to be considered for averaging across multiple CSI-RS beams for a UE having a single Rx chain.

Aspect 24: The method of any of Aspects 15-23, wherein the measurement consolidation threshold is an absolute threshold that a reference signal measurement quantity is required to satisfy in order to be averaged within the neighbor cell measurement.

Aspect 25: The method of any of Aspects 15-24, wherein the measurement configuration is indicated in one or more SIBs for intra-frequency cell reselection or inter-frequency cell reselection.

Aspect 26: The method of any of Aspects 15-25, wherein the measurement configuration is indicated in an IE associated with one or more measurements that the UE is to obtain in a RRC idle state or an RRC inactive state.

Aspect 27: The method of any of Aspects 15-26, wherein the measurement configuration is indicated in an IE associated with one or more measurements that the UE is to obtain in a RRC connected state.

Aspect 28: The method of any of Aspects 15-27, further comprising: receiving, from a UE having a single Rx chain, a measurement report that includes the neighbor cell measurement that is based at least in part on the value of the measurement consolidation threshold for a UE having a single Rx chain.

Aspect 29: An apparatus for wireless communication at a device, comprising a processor; memory coupled with the processor; and instructions stored in the memory and executable by the processor to cause the apparatus to perform the method of one or more of Aspects 1-14.

Aspect 30: A device for wireless communication, comprising a memory and one or more processors coupled to the memory, the one or more processors configured to perform the method of one or more of Aspects 1-14.

Aspect 31: An apparatus for wireless communication, comprising at least one means for performing the method of one or more of Aspects 1-14.

Aspect 32: A non-transitory computer-readable medium storing code for wireless communication, the code comprising instructions executable by a processor to perform the method of one or more of Aspects 1-14.

Aspect 33: A non-transitory computer-readable medium storing a set of instructions for wireless communication, the set of instructions comprising one or more instructions that, when executed by one or more processors of a device, cause the device to perform the method of one or more of Aspects 1-14.

Aspect 34: An apparatus for wireless communication at a device, comprising a processor; memory coupled with the processor; and instructions stored in the memory and executable by the processor to cause the apparatus to perform the method of one or more of Aspects 15-28.

Aspect 35: A device for wireless communication, comprising a memory and one or more processors coupled to the memory, the one or more processors configured to perform the method of one or more of Aspects 15-28.

Aspect 36: An apparatus for wireless communication, comprising at least one means for performing the method of one or more of Aspects 15-28.

Aspect 37: A non-transitory computer-readable medium storing code for wireless communication, the code comprising instructions executable by a processor to perform the method of one or more of Aspects 15-28.

Aspect 38: A non-transitory computer-readable medium storing a set of instructions for wireless communication, the set of instructions comprising one or more instructions that, when executed by one or more processors of a device, cause the device to perform the method of one or more of Aspects 15-28.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors, coupled to the one or more memories, configured to cause the UE to:
      receive, from a network node, a measurement configuration that indicates a first value of a measurement consolidation threshold for a UE having multiple receive (Rx) chains, wherein a second value of the measurement consolidation threshold for a UE having a single receive (Rx) chain is based at least in part on an offset from the first value; and
      obtain a neighbor cell measurement based at least in part on the second value of the measurement consolidation threshold for the UE having the single Rx chain.

2. The UE of claim 1, wherein the measurement configuration further indicates the second value of the measurement consolidation threshold for the UE having the single Rx chain.

3. The UE of claim 1, wherein the measurement configuration indicates a value of the offset.

4. The UE of claim 1, wherein the measurement configuration indicates a value of the offset from a set that includes multiple possible values for the offset.

5. The UE of claim 1, wherein a value of the offset is predefined.

6. The UE of claim 1, wherein the first value of the measurement consolidation threshold is associated with a reference signal received power measurement, a reference signal received quality measurement, or a signal-to-interference-plus-noise ratio measurement.

7. The UE of claim 1, wherein the first value of the measurement consolidation threshold indicates a minimum synchronization signal block (SSB) beam measurement quantity to be considered for averaging across multiple SSB beams for the UE having the single Rx chain.

8. The UE of claim 1, wherein the first value of the measurement consolidation threshold indicates a minimum channel state information reference signal (CSI-RS) beam measurement quantity to be considered for averaging across multiple CSI-RS beams for the UE having the single Rx chain.

9. The UE of claim 1, wherein the measurement consolidation threshold is an absolute threshold that a reference signal measurement quantity is required to satisfy in order to be averaged within the neighbor cell measurement.

10. The UE of claim 1, wherein the measurement configuration is indicated in one or more system information blocks for intra-frequency cell reselection or inter-frequency cell reselection.

11. The UE of claim 1, wherein the measurement configuration is indicated in an information element associated with one or more measurements that the UE is to obtain in a radio resource control (RRC) idle state or an RRC inactive state.

12. The UE of claim 1, wherein the measurement configuration is indicated in an information element associated with one or more measurements that the UE is to obtain in a radio resource control (RRC) connected state.

13. The UE of claim 1, wherein the one or more processors are further configured to cause the UE to:
    transmit, to the network node, a measurement report that includes the neighbor cell measurement that is based at least in part on the second value of the measurement consolidation threshold for the UE having the single Rx chain.

14. A method of wireless communication performed by a user equipment (UE), comprising:
    receiving, from a network node, a measurement configuration that indicates a first value of a measurement consolidation threshold for a UE having multiple receive (Rx) chains, wherein a second value of the measurement consolidation threshold for a UE having a single receive (Rx) chain is based at least in part on an offset from the first value; and
    obtaining a neighbor cell measurement based at least in part on the second value of the measurement consolidation threshold for the UE having the single Rx chain.

15. The method of claim 14, wherein the measurement configuration further indicates the second value of the measurement consolidation threshold for the UE having the single Rx chain.

16. The method of claim 14, wherein the measurement configuration indicates a value of the offset.

17. The method of claim 14, wherein the measurement configuration indicates a value of the offset from a set that includes multiple possible values for the offset.

18. The method of claim 14, wherein a value of the offset is predefined.

19. The method of claim 14, wherein the first value of the measurement consolidation threshold is associated with a reference signal received power measurement, a reference signal received quality measurement, or a signal-to-interference-plus-noise ratio measurement.

20. The method of claim 14, wherein the first value of the measurement consolidation threshold indicates a minimum synchronization signal block (SSB) beam measurement quantity to be considered for averaging across multiple SSB beams for the UE having the single Rx chain.

21. The method of claim 14, wherein the first value of the measurement consolidation threshold indicates a minimum channel state information reference signal (CSI-RS) beam measurement quantity to be considered for averaging across multiple CSI-RS beams for the UE having the single Rx chain.

22. The method of claim 14, wherein the measurement consolidation threshold is an absolute threshold that a reference signal measurement quantity is required to satisfy in order to be averaged within the neighbor cell measurement.

23. The method of claim 14, wherein the measurement configuration is indicated in one or more system information blocks for intra-frequency cell reselection or inter-frequency cell reselection.

24. The method of claim 14, wherein the measurement configuration is indicated in an information element associated with one or more measurements that the UE is to obtain in a radio resource control (RRC) idle state or an RRC inactive state.

25. The method of claim 14, wherein the measurement configuration is indicated in an information element associated with one or more measurements that the UE is to obtain in a radio resource control (RRC) connected state.

26. The method of claim 14, further comprising:
transmitting, to the network node, a measurement report that includes the neighbor cell measurement that is based at least in part on the second value of the measurement consolidation threshold for the UE having the single Rx chain.

27. A non-transitory computer-readable medium storing a set of instructions for wireless communication, the set of instructions comprising:
one or more instructions that, when executed by one or more processors of a user equipment (UE), cause the UE to:
receive, from a network node, a measurement configuration that a first value of indicates a measurement consolidation threshold for a UE having multiple receive (Rx) chains, wherein a second value of the measurement consolidation threshold for a UE having a single receive (Rx) chain is based at least in part on an offset from the first value; and
obtain a neighbor cell measurement based at least in part on the second value of the measurement consolidation threshold for the UE having the single receive (Rx) chain.

28. An apparatus for wireless communication, comprising:
means for receiving, from a network node, a measurement configuration that indicates a first value of a measurement consolidation threshold for an apparatus having multiple receive (Rx) chains, wherein a second value of the measurement consolidation threshold for a apparatus having a single receive (Rx) chain is based at least in part on an offset from the first value; and
means for obtaining a neighbor cell measurement based at least in part on the second value of the measurement consolidation threshold for the apparatus having the single receive (Rx) chain.

29. The non-transitory computer-readable medium of claim 27, wherein the first value of the measurement consolidation threshold indicates a minimum measurement quantity to be considered for averaging across multiple beams for the UE having the single Rx chain.

30. The apparatus of claim 28, wherein the first value of the measurement consolidation threshold indicates a minimum measurement quantity to be considered for averaging across multiple beams for the apparatus having the single Rx chain.

* * * * *